(12) United States Patent
Didomenico et al.

(10) Patent No.: US 11,153,348 B2
(45) Date of Patent: Oct. 19, 2021

(54) THIRD PARTY INTEGRATION WITH ENTERPRISE SECURITY MANAGEMENT TOOL

(71) Applicant: Unisys Corporation, Blue Bell, PA (US)

(72) Inventors: Michael Didomenico, Malvern, PA (US); Michael C. Leap, Malvern, PA (US); Emily M. Shoup, Malvern, PA (US); Richard W. Phelps, Cary, NC (US); Robert A. Johnson, Collegeville, PA (US); Philippe Jolly, Blue Bell, PA (US); Jared Poetter, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 272 days.

(21) Appl. No.: 16/519,641

(22) Filed: Jul. 23, 2019

(65) Prior Publication Data

US 2020/0067986 A1 Feb. 27, 2020

Related U.S. Application Data

(60) Provisional application No. 62/702,144, filed on Jul. 23, 2018.

(51) Int. Cl.
*H04L 29/06* (2006.01)
*H04L 12/24* (2006.01)
*H04L 29/08* (2006.01)

(52) U.S. Cl.
CPC .............. *H04L 63/20* (2013.01); *H04L 41/28* (2013.01); *H04L 63/0209* (2013.01); *H04L 63/1433* (2013.01); *H04L 67/20* (2013.01)

(58) Field of Classification Search
CPC . H04L 63/20; H04L 63/0209; H04L 63/1433; H04L 41/28; H04L 41/08; H04L 67/20
See application file for complete search history.

(56) References Cited

U.S. PATENT DOCUMENTS

| | | | |
|---|---|---|---|
| 2005/0102534 A1* | 5/2005 | Wong | G06F 21/577 726/4 |
| 2006/0075503 A1* | 4/2006 | Bunker | G06F 11/324 726/25 |
| 2013/0080636 A1* | 3/2013 | Friedman | H04L 41/08 709/225 |

(Continued)

OTHER PUBLICATIONS

Darryl Taft, "Unisys Brings 'Stealth' Enterprise Security to AWS Cloud", eWeek.com, retrieved from https://www.eweek.com/security/unisys-brings-stealth-enterprise-security-to-aws-cloud/, Published Jan. 19, 2016 (Year: 2016).*

*Primary Examiner* — Chau Le
(74) *Attorney, Agent, or Firm* — Merchant & Gould P.C.

(57) ABSTRACT

Methods and systems for providing integration between an enterprise security management configuration tool and third party network traffic software are disclosed. By defining a software interface through which configuration data for third party networking devices can be queried and configuration data accessed, the enterprise security management configuration tool can compare overall network traffic to the configuration provided by the third party networking software to assess an overall security level within an enterprise network.

20 Claims, 27 Drawing Sheets

(56) References Cited

U.S. PATENT DOCUMENTS

| | | | |
|---|---|---|---|
| 2015/0229660 A1* | 8/2015 | Palmin | H04L 63/1416 |
| | | | 726/23 |
| 2018/0219749 A1* | 8/2018 | Bugenhagen | H04L 41/14 |
| 2018/0309788 A1* | 10/2018 | Johnson | H04L 63/104 |
| 2018/0309791 A1* | 10/2018 | Johnson | H04L 63/102 |
| 2019/0052664 A1* | 2/2019 | Kibler | H04L 63/1433 |
| 2019/0327260 A1* | 10/2019 | Adamson | H04L 43/065 |

\* cited by examiner

THIRD PARTY INTEGRATION WITH ENTERPRISE SECURITY MANAGEMENT TOOL

CROSS-REFERENCE TO RELATED APPLICATIONS

The present application claims priority from U.S. Provisional Patent Application No. 62/702,144, filed on Jul. 23, 2018, the disclosure of which is hereby incorporated by reference in its entirety.

BACKGROUND

Robust enterprise security software is complex. It often requires installation of specific security software packages at each trusted computer associated with the enterprise, as well as management of various profiles for each of a number of different types of users having differing roles. Furthermore, each server within an enterprise network will typically have a collection of allowed connections external to the network to be managed.

The complexity of enterprise security software increases with the level of security required. For example, in enterprise networks in which data must be secured during intra-network storage and/or transmission, detailed definitions regarding a level of security for each user, types of encryption, permissions, and other policies must be set. Because there are often a large number of computing systems within such an enterprise network, provisioning each system can become so complex as to be time- and cost-prohibitive to install such enterprise security software, or at the very least to exploit its full capabilities. Although network security administrators may find some ways to simplify the deployment of a security solution, for example by creating a template image of security software that can then be customized for each server or endpoint to be provisioned, this still requires each endpoint to be custom provisioned by the network security administrator, which remains time-intensive.

Furthermore, for network security administrators in organizations that are first installing enterprise security software, it can be difficult, if not impossible, to know what specific policies should be created and how to create or deploy such policies within their existing network. Substantial training and weeks, if not months, of deployment/implementation operations are therefore required in many such situations.

Accordingly, it may be advantageous to provide a convenient visual tool that can assist in configuring a security policy for an organization having various types of computing resources (e.g., database servers, application servers, email servers, user nodes in various departments, etc.). However, in many cases, enterprises have existing software tools used to configure networking hardware. For example, network firewalls may have management software that allows an administrative user to define fire wall policies, e.g., whitelists, or other user permissions. While this software is convenient and in many cases necessary for management of those networking resources, that software does not allow for management of security policies across the entire enterprise, which may include equipment and software from many different suppliers. This may leave "blind spots" where traffic is uncontrolled, since not all traffic might be managed using that software or networking equipment. Accordingly, integration of security management solutions is lacking.

SUMMARY

In a first aspect, a method includes receiving a definition in an enterprise security management software tool of a node within an enterprise network that represents a third party network traffic management device controlled using third party traffic management software, the third party network traffic management device positioned within the enterprise to manage traffic within a portion of the enterprise network. The method includes accessing, via an Application Programming Interface of the third party traffic management software, configuration data for the third party network traffic management device. The method also includes receiving, at the enterprise security management software tool, network traffic data describing network traffic in the enterprise network, and generating an assessment of network security coverage by policies in one or both of the enterprise security management software tool and the third party network traffic management software based at least on the network traffic data, the configuration data, and a security policy defined for the enterprise network by the enterprise security management software tool.

In a second aspect, a system an enterprise security management software system is disclosed. The enterprise security management system includes a computing system within an enterprise and having an enterprise security management software tool installed thereon. The enterprise security management software tool is configured to: receive a definition in an enterprise security management software tool of a node within an enterprise network that represents a third party network traffic management device controlled using third party traffic management software, the third party network traffic management device positioned within the enterprise to manage traffic within a portion of the enterprise network; access, via an Application Programming Interface of the third party traffic management software, configuration data for the third party network traffic management device; receive, at the enterprise security management software tool, network traffic data describing network traffic in the enterprise network; and generate an assessment of network security coverage by policies in one or both of the enterprise security management software tool and the third party network traffic management software based at least on the network traffic data, the configuration data, and a security policy defined for the enterprise network by the enterprise security management software tool.

In a third aspect, a non-transitory computer readable storage medium having computer-executable instructions stored thereon is disclosed. The instructions, when executed by a computing system, cause the computing system to perform: receiving a definition in an enterprise security management configuration tool of a node within an enterprise network that represents a third party network traffic management device controlled using third party traffic management software, the third party network traffic management device positioned within the enterprise to manage traffic within a portion of the enterprise network; accessing, via an Application Programming Interface of the third party traffic management software, configuration data for the third party network traffic management device; receiving, at the enterprise security management configuration tool, network traffic data describing network traffic in the enterprise network; generating an assessment of network security coverage by policies in one or both of the enterprise security management configuration tool and the third party network traffic management software based at least on the network traffic data, the configuration data, and a security policy defined for the enterprise network by the enterprise security management configuration tool; and deploying a solution from the enterprise security management configuration tool to an enterprise security manager, thereby applying a security policy defined by the solution to the enterprise network.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
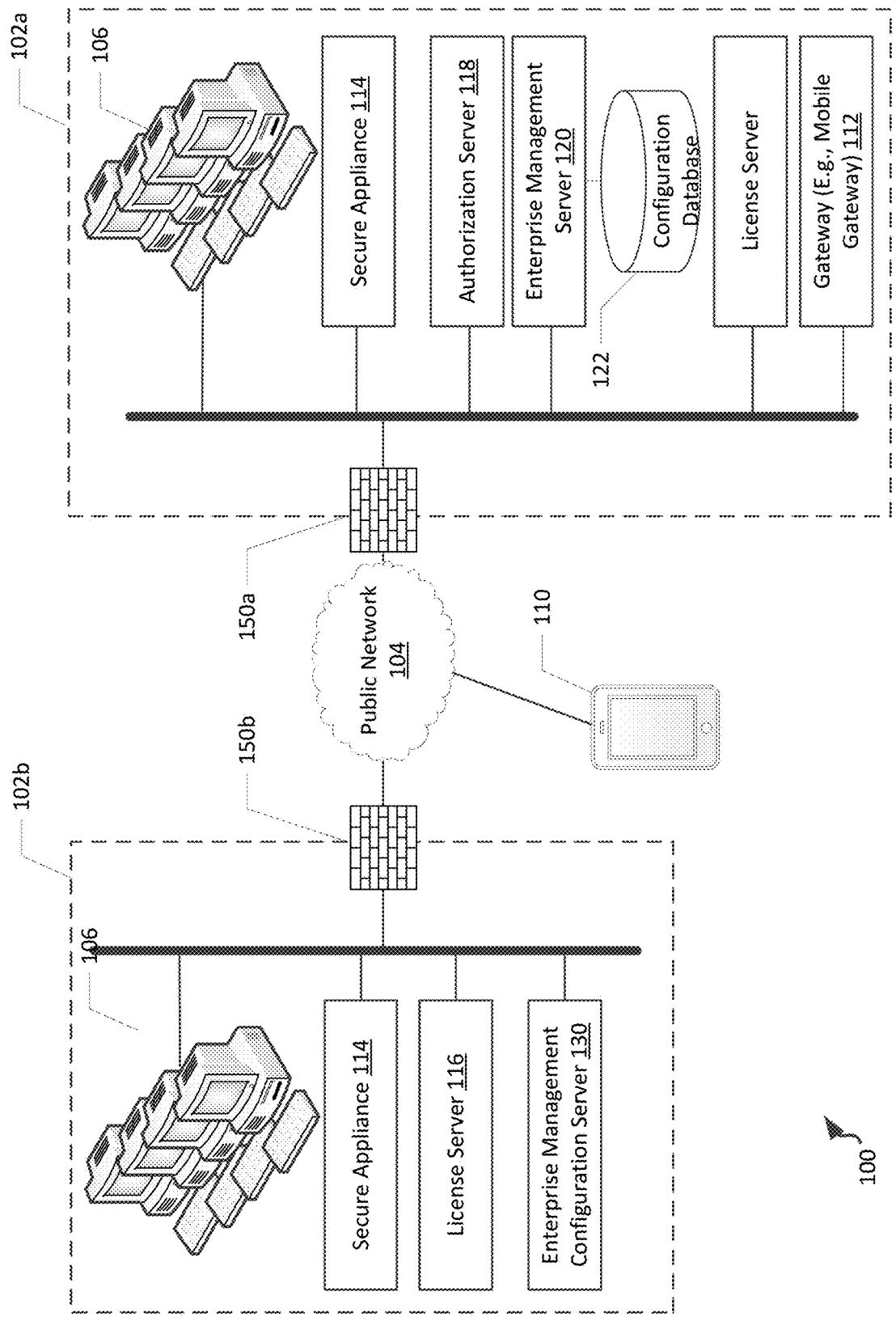
FIG. 1 illustrates a schematic view of an enterprise network distributed across premises, representing an example network in which aspects of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

As briefly described above, embodiments of the present invention are directed to providing integration between an enterprise security management configuration tool and third party network traffic software that can be used to manage network traffic through third party networking devices, such as routers, firewalls, or other physical equipment. By defining a software interface through which configuration data for third party networking devices can be queried and configuration data accessed, the enterprise security management configuration tool can compare overall network traffic to the configuration provided by the third party networking software to assess an overall security level within an enterprise network. Changes to security settings within either the enterprise security management configuration tool itself or within the third party software or devices can be detected and the enterprise security management configuration tool can automatically update its overall assessment of security coverage within the enterprise network. This third party integration allows the enterprise security management configuration tool to maintain an overall view of enterprise network security across an enterprise network, while allowing an enterprise's network administrator to use a combination of security software tools, including tools specifically designed for custom security and networking hardware, thereby enhancing network security while neither splintering overall management across a large number of software tools or losing the overall view of network security that is provided by a unified solution.

By way of background, enterprises implementing security systems in which traffic among nodes within the enterprise network is secured must be configured using complex security policies that are coordinated to ensure that the various endpoints, or nodes, have access to various system resources that may be needed by that node or endpoint. One example of such a security system that can be implemented is the Stealth enterprise security solution from Unisys Corporation of Blue Bell, Pa. Generally, such a system is implemented using an enterprise management server that maintains security policies for various network endpoints, and distributes security policies to those endpoints, in terms of encryption keys that define communities of interest within the enterprise as well as filter lists identifying permitted and forbidden traffic patterns from each endpoint. One particular attribute of the Stealth solution is that for entities not included within a particular community of interest, the resource that is protected using that solution is not visible, and therefore would not be a hacking target (e.g., for DDOS attacks, or other types of attacks) given that its network address would not be known.

Due to the complexity of enterprise security policies and enterprise topologies, establishing an enterprise security policy that can apply across an entire enterprise is complex. To simplify the complexity of such policy definition, the present Applicant has developed an enterprise security management configuration tool. Aspects of such a tool are described in the following U.S. patent applications, the disclosure of which is hereby incorporated by reference in their entireties: U.S. patent application Ser. No. 15/494,852 ; U.S. patent application Ser. No. 15/494,869 ; U.S. patent application Ser. No. 15/494,896 ; and U.S. patent application Ser. No. 15/494,907 .

I. Enterprise Security Configuration Server and Environment

As noted above, solutions for creating enterprise security policies are complex. As such, an enterprise security configuration server is included in example networks in which such security deployments are performed, and can create solutions for import into an enterprise server for distribution across an enterprise in a straightforward manner. FIGS. 1-5 illustrate example computing systems useable to implement an enterprise network and deploy security settings in such a network. FIGS. 6-27 illustrate an overall enterprise security management configuration tool and methods of its use, including user interfaces useable within the tool to provide enterprise-wide security policy generation and assessment, across one or more third party security software solutions.

Referring now to FIG. 1, a schematic view of one example enterprise network 100 is illustrated. The enterprise network 100 is distributed across premises, and therefore includes at least a first premises 102a and a second premises 102b separated by a network 104, which can in some cases represent an at least partially public network, such as the Internet. The enterprise network 100 includes a plurality of endpoints 106. The endpoints 106 can be, for example, servers or workstations operable or accessible by a user to perform various tasks germane to the enterprise.

Users of such endpoints in this context may be associated with the enterprise and may be afforded access to computing resources at the endpoints 106; in such cases, different users may have different access rights to data or resources included in the enterprise. Accordingly, users are, via a management system, separated into defined communities of interest (COIs) which allows for common access rights to a group of users. The common access rights may be, in a corporate context, access rights associated with a particular department or project; in other contexts, access rights may be defined by a particular security clearance, membership in a particular group, or having a particular interest in common data or applications.

In the embodiment shown, each of the premises 102a-b have a plurality of endpoints 106 located within the premises. In such arrangements, the endpoints 106 can be interconnected at each of the premises using standard communications equipment (not shown) such as routers, switches, and cabling. In some embodiments, the endpoints 106 can be virtualized endpoints maintained on one or more servers. In such cases, one possible implementation of such an arrangement could be provided using S-Par Secure Partitioning platform provided by Unisys Corporation of Blue Bell, Pa. Other virtualization systems could be used as well.

It is noted that, in addition to endpoints 106 at premises 102a-b, other access mechanisms to the enterprise network 100 may be desirable as well. For example, in the embodiment shown a mobile device 110 may be used to access data or computing resources of the enterprise. In some embodiments, the mobile device 110 can establish a secure connection with a mobile gateway, such as gateway 112 which can act as a proxy for the mobile device 110 within the network, including receiving access to other endpoints within the network based on a community of interest of the user associated with the mobile device 110.

Referring to the premises 102*a-b* generally, it is noted that in the embodiment shown, each premises may include a secure appliance 114. The secure appliance can manage secure communications among endpoints 106 or between premises 102*a-b*. In example embodiments, the secure appliance 114 can be used to deliver encryption keys or encryption features (e.g., a driver with which endpoints can secure data for communication) for endpoints. In alternative embodiments, the secure appliance 114 may not be needed by some or all endpoints; in such arrangements, a native security feature, such as IPsec, could be used by the endpoints to ensure security within a premises 102, or between premises 102*a-b* generally. In such cases, encryption keys and standards can be defined centrally, for example using the management server described herein, to establish different keys and different communities of interest for use by the authorized users of endpoints across the premises 102*a-b*.

Additionally, in the embodiment shown, one or both premises 102*a-b* can include a license server 116. The license server 116 can manage and track license usage by the endpoints 106. For example one or more endpoints 106 may request a license to particular software or to a particular network resource. In such cases, the license server 116 can be contacted to grant or deny a license to such software or resource, based on a number of licenses available and whether the user of the endpoint is authorized to use such software or resource.

Additionally, in the embodiment shown, an authorization server 118 can be provided at one or more of the premises 102. The authorization server 118 can be accessed by an endpoint that is seeking authorization to access other resources within the network. Generally, the authorization server 118 can establish a secure communication session with that endpoint to provide authorization information (keys, settings, COI filters, etc.) to allow that endpoint to communicate with other endpoints within the network.

In addition to the above, a management server 120 is located at one of the premises 102*a-b*. The management server 120 provides a universally-accessible access location at which management settings can be viewed, enterprise access attempts logged, license tracking can be managed, and security arrangements defined, including definition of encryption policies, communities of interest, enterprise resources available, and other features. Additional details regarding operation of the management server are described in U.S. patent application Ser. No. 14/688,348, entitled "Enterprise Management for Secure Network Communications over IPSec", assigned to Unisys Corporation of Blue Bell, Pa., the disclosure of which is hereby incorporated by reference in its entirety.

Generally, the management server 120 is communicatively connected to a configuration database 122 (e.g., by hosting the configuration database or being communicatively connected to a separate computing system or systems that host that database). The configuration database generally stores configuration settings included in one or more configuration profiles for the enterprise network; and one or more interface definitions useable by the web interface to provide administrative access to the configuration settings. Details regarding the data stored in the configuration database are provided in U.S. patent application Ser. No. 14/688,348, entitled "Enterprise Management for Secure Network Communications over IPSec", the disclosure of which was previously incorporated by reference.

Enterprise management within the enterprise network 100 can be distributed among one or more of the management server 120, authorization server 118, license server 116, and secure appliance 114. Enterprise management provides the general management and control for servers using the Stealth security features of an enterprise network, and in particular Stealth installations that apply IPsec-based security. Each enterprise network, or enclave, can have a management instance that performs various user authentication, logging, licensing, certificate management, administration, web services, and software update features. Regarding authorization, the management service can ensure that a user is authenticated and authorized when logging on to the endpoint 106. The endpoint 106 receives an Authorization Token (AuthToken) that identifies the user's COI membership status.

The management server 120 hosts a management service that can also receive log information to be recorded, and can issue commands to the server to control its behavior or to request status information. This includes retrieving debugging information regarding security software installed through the enterprise. The management service also controls licensing, for example by installing a license System Control Number (SCN) and license values (strings) on a license host, such as either the management server 120 or the authorization server 118. Remote authorization servers, such as authorization server 118, communicate with a license host to share its licenses. The management service also performs certificate management to maintain the certificates used for authentication.

Administrative users of the enterprise network 100, and management server 120 specifically, will use a GUI to control account management, role-based authorization, certificate management, and other administrative tasks. In some embodiments, a web services interface is provided to allow network access to management services. Additionally, the enterprise management features of the present disclosure are configurable to inventory levels of installed software and provide for software updates. This may include updates for endpoints as well as the management service itself.

In addition to the above, an enterprise management configuration server 130 can be included within the enterprise network 100. The enterprise management configuration server 130 generates a user interface at which security policies can be generated, for import into the management server 120 and configuration database 122. Although shown at premises 102*b*, it is understood that the enterprise management configuration server 130 could be located at a same location as the management server 120, or indeed be implemented on the same physical computing system as the management server 120, in alternative implementations.

In general, although the enterprise network 100 as shown is disclosed as having a plurality of premises 102*a-b* and a single management server 120, it is noted that other arrangements may exist in which management servers 120 can be distributed at one or more distributed locations, each of which are configured to communicate with an instance of the configuration database 122. Furthermore, one or more of those management servers 120 can be maintained as a redundant management server that is accessed in the event of failure of a primary management server. Additionally, since the management server 120 can be, in some embodiments, implemented as a process that executes within a computing environment, functionality of the management server can be combined with that of other systems on a single computing system or separated onto different computing systems; in some embodiments, a user interface server, management server, authorization server, license server, and/or other enterprise network security services can be located on separate servers, while in other embodiments two or more of these services can be combined on a single device (e.g., a discrete physical computing device or a virtual computing device installed on a partition of a physical computing device). Accordingly, enterprise management configuration server 130 can be configured to distribute security policy configurations to one or more management servers 120, or different security policies (or portions of a common security policy, as discussed further below) to different management servers.

Still referring to FIG. 1, it is noted that at each premises 102a-b, one or more third party networking devices can be used. In the example shown, firewall devices 150a-b are shown at the public network interface to each of the premises. This allows the enterprise to control the extent to which public network access is allowed, while defining rules for trusted traffic (e.g., traffic originating from another of the premises of the enterprise). It is noted that such firewalls may or may not be located at such boundary points of an enterprise, but may be located elsewhere within an enterprise network, or may protect specific servers at specific enterprise premises; still further, only portions of enterprise networks may be protected by such network devices.

It is also noted, in conjunction with the present disclosure, that some firewall devices, such as devices 150a-b, can include third party security software installed thereon. The third party security software may allow for custom configurations of the device, management of security policies (e.g., whitelists, encryption policies/standards, and other security features) that may or may not be definable enterprise-wide. Accordingly, in many cases, an enterprise network administrator may elect to continue to use such third party security software in conjunction with an enterprise-wide security configuration tool.

Figure 2:
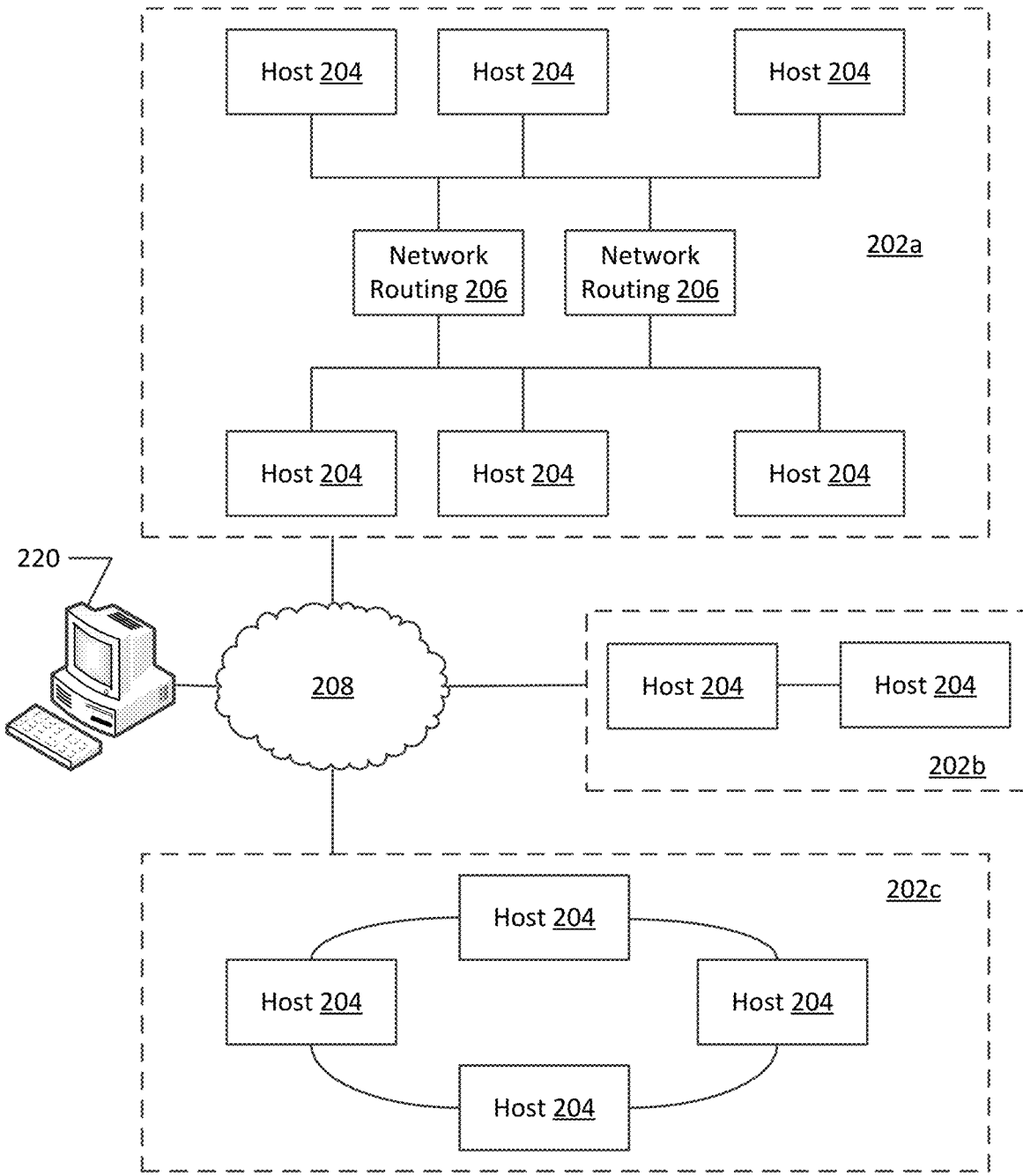
FIG. 2 illustrates a distributed multi-host system in which aspects of the present disclosure can be implemented.
Figure 3:
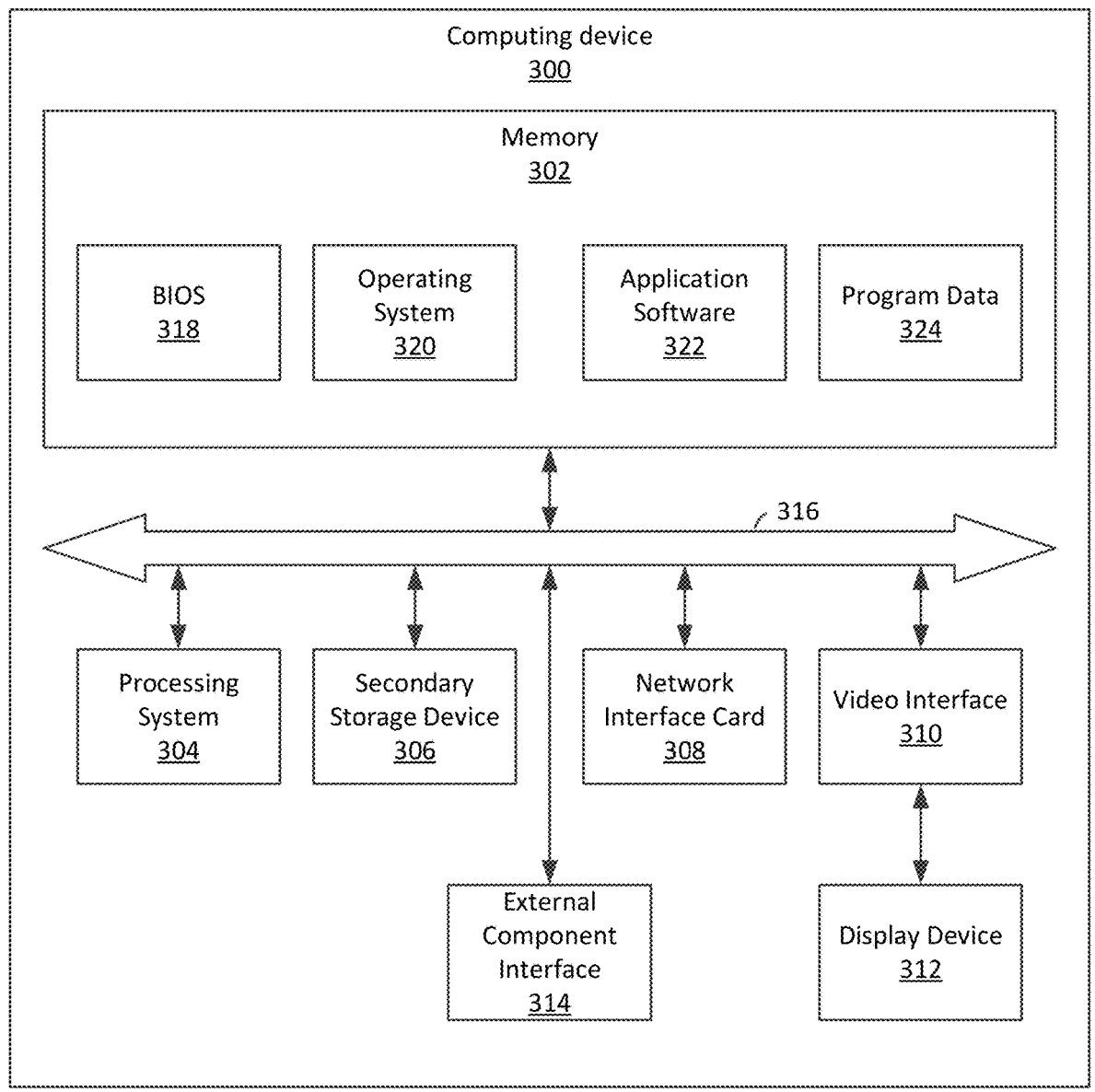
FIG. 3 is a schematic illustration of an example computing system in which aspects of the present disclosure can be implemented.

Referring now to FIG. 2, a distributed multi-host system 200 is shown in which aspects of the present disclosure can be implemented. The system 200 represents a possible arrangement of computing systems or virtual computing systems useable to implement the enterprise network of FIG. 1. In the embodiment shown, the system 200 is distributed across one or more locations 202, shown as locations 202a-c. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 202a-c each include one or more host systems 204, or nodes. The host systems 204 represent host computing systems, and can take any of a number of forms. For example, the host systems 204 can be server computing systems having one or more processing cores and memory subsystems and are useable for large-scale computing tasks. In one example embodiment, a host system 204 can be as illustrated in FIG. 3.

As illustrated in FIG. 2, a location 202 within the system 200 can be organized in a variety of ways. In the embodiment shown, a first location 202a includes network routing equipment 206, which routes communication traffic among the various hosts 204, for example in a switched network configuration. Second location 202b illustrates a peer-to-peer arrangement of host systems. Third location 202c illustrates a ring arrangement in which messages and/or data can be passed among the host computing systems themselves, which provide the routing of messages. Other types of networked arrangements could be used as well.

In various embodiments, at each location 202, the host systems 204 are interconnected by a high-speed, high-bandwidth interconnect, thereby minimizing latency due to data transfers between host systems. In an example embodiment, the interconnect can be provided by an Infiniband switched fabric communications link; in alternative embodiments, other types of interconnect technologies, such as Fibre Channel, PCI Express, Serial ATA, or other interconnect could be used as well.

Among the locations 202a-c, a variety of communication technologies can also be used to provide communicative connections of host systems 204 at different locations. For example, a packet-switched networking arrangement, such as via the Internet 208, could be used. Preferably, the interconnections among locations 202a-c are provided on a high-bandwidth connection, such as a fiber optic communication connection.

In the embodiment shown, the various host system 204 at locations 202a-c can be accessed by a client computing system 220 such as the endpoints 106 of FIG. 1. The client computing system can be any of a variety of desktop or mobile computing systems, such as a desktop, laptop, tablet, smartphone, or other type of user computing system. In alternative embodiments, the client computing system 220 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well.

It is noted that, in various embodiments, different arrangements of host systems 204 within the overall system 200 can be used; for example, different host systems 404 may have different numbers or types of processing cores, and different capacity and type of memory and/or caching subsystems could be implemented in different ones of the host system 404. Furthermore, one or more different types of communicative interconnect technologies might be used in the different locations 202a-c, or within a particular location.

Relevant to the present disclosure, it is noted that all or fewer than all locations 202a-c may have associated therewith third party firewall devices or other third party security devices having third party security software. Accordingly, there may be a circumstance in which the third party security software does not provide a unified view of security policies across an organization. Still further, if two security configuration software tools from different software providers are used, it can be difficult to determine (other than manually or by testing) whether any traffic within the enterprise network remains unprotected based on the currently-applied security policies across the network and across the various configuration tools. Accordingly, and as described further below, security information can be accessed from such third party security software, and mapped onto a model used in an enterprise-wide security configuration tool. By accessing network traffic data describing network traffic within the network, a user can then see where within an enterprise network is unaffected by the third party security software or devices, and the enterprise security configuration tool can be used to modify an enterprise-wide security policy to ensure enterprise-wide security while separate security software coexists within the enterprise network.

Referring now to FIG. 3, a schematic illustration of an example discrete computing system in which aspects of the present disclosure can be implemented. The computing device 300 can represent, for example, a native computing system within which one or more of servers 116-120, 130 can be implemented, or an implementation of an endpoint 106, or mobile device 110 (a.k.a. nodes). In particular, the computing device 300 represents the physical construct of an example computing system at which an endpoint or server could be established. In some embodiments, the computing device 300 implements virtualized or hosted systems, and executes one particular instruction set architecture while being used to execute non-native software and/or translate non-native code streams in an adaptive manner, for execution in accordance with the methods and systems described herein.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. In the example of FIG. 3, the communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300. Example program data and application software is described below in connection with FIGS. 4-5.

Although particular features are discussed herein as included within a computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. Computer storage media does not include a carrier wave or other propagated or modulated data signal. In some embodiments, the computer storage media includes at least some tangible features; in many embodiments, the computer storage media includes entirely non-transitory components.

In general the endpoints of the present disclosure can be configured various ways, with registry settings selected to configure the endpoint to communicate according to an appropriate communication protocol. In some example embodiments, each IPv6-based system includes a capability to communicate with the authorization server via either IPv4 or IPv6 communications. Other administrator-selected IP-based protocols could be used as well.

Figure 4:
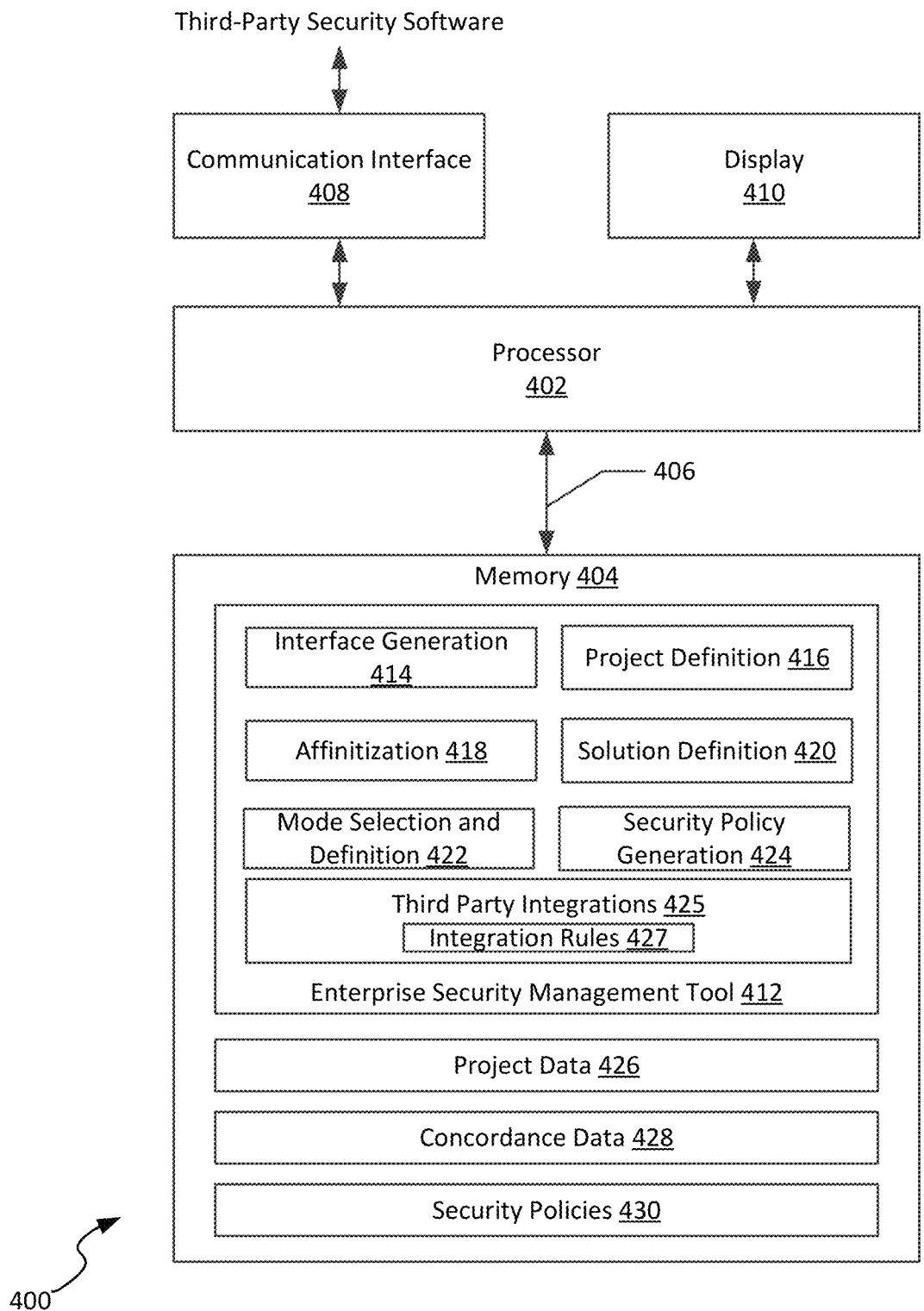
FIG. 4 is a schematic illustration of an example computing system useable within the enterprise network as an enterprise security management configuration server.

FIG. 4 is a schematic illustration of an example computing system useable within the enterprise network as an enterprise security management configuration server, such as the enterprise management configuration server 130 of FIG. 1.

In general, the computing system 400 includes a processor 402 communicatively connected to a memory 404 via a data bus 406. The processor 402 can be any of a variety of types of programmable circuits capable of executing computer-readable instructions to perform various tasks, such as mathematical and communication tasks, such as those described above in connection with FIG. 3. The memory 404 can include any of a variety of memory devices, such as using various types of computer-readable or computer storage media, as also discussed above. In the embodiment shown, the memory 404 stores a query formulation application 412, discussed in further detail below. The computing system 400 can also include a communication interface 408 configured to receive and transmit data, for example to access data in an external database, such as database 122 of FIG. 1, or to serve a web interface useable to configure security settings within an enterprise, as discussed herein. Additionally, a display 410 can be used for viewing a local version of a user interface, as described herein, via an enterprise security management tool 412.

In various embodiments, the enterprise security management tool 412 generally is configured to generate a configuration user interface accessible by a security administrator of an enterprise to simplify creation and deployment of security policies across the enterprise. In the example embodiment shown, the enterprise security management tool 412 includes an interface generation component 414, a project definition component 416, an affinitization component 418, a solution definition component 420, a mode selection and definition component 422, a security policy generation component 424, a third party integration component 425, and a service manager 427. As further outlined below, the memory 404 can include project data 426, concordance data 428, and security policies 430.

In example embodiments, the interface generation component 414 can be configured to generate and serve a configuration user interface, such as is explained fully both below and in conjunction with the following copending U.S. patent applications, each of which were previously incorporated by reference in their entireties: U.S. patent application Ser. No. 15/494,852 ; U.S. patent application Ser. No. 15/494,869 ; U.S. patent application Ser. No. 15/494,896 ; and U.S. patent application Ser. No. 15/494,907 .

The configuration user interface presents to a security administrator a simplified topology of an enterprise network, and allows for grouping of nodes (e.g., servers and endpoints) that are commonly secured using similar security policy settings, and allows for automatic grouping and default security settings to simplify security policy deployment. A project definition component 416 is configured to manage a project, which refers to a container for saved work associated with security configuration settings.

An affinitization component 418 is configured to determine an extent of similarity among nodes in an enterprise network, and in some embodiments group those nodes into "profiles" or collections of similar-acting nodes. For example, a profile may contain a set of application servers that serve a common application, or redundant database servers, or web servers, or even user endpoints having common communication patterns. Although the servers or nodes grouped into a profile may operate somewhat differently, in some embodiments (discussed in further detail below) the affinitization component can determine a level of similarity between nodes and group those nodes that have a similarity above a specified "affinitization threshold". That threshold may be set using a simple user interface feature, as further discussed below. Furthermore, affinitization can be set automatically using such a threshold, or can be set manually by grouping a set of nodes within a profile "container" that can be created using the configuration user interface. As further discussed below, the grouped nodes within the profile can be treated similar to one another, by assigning a set of common security settings (e.g., common filter lists, security enablement/disablement, communities of interest, etc.).

A solution definition component 420 is configured to define one or more solutions in the configuration user interface. Each solution can be made up of two or more profiles (and likely a channel, indicating some communicative relationship between those profiles). While affinitized nodes in a profile will typically have common security settings because of common usage, profiles within a solution may have the same or only similar security settings based on the common data shared among those profiles, or that the profiles cooperate to serve end-users in a particular manner. In various embodiments, the solution definition component 420 can include an automated solution definition option in which the enterprise security management tool identifies root and chained profiles that should be included in a solution or solutions in the enterprise network. In still further embodiments, the solution definition component 420 can also, or in the alternative, include a manual solution definition option in which the enterprise security management tool allows a user to define a root profile and one or more chained profiles as part of a solution. Examples of automatically generated and manually generated solutions are described in further detail below.

A mode selection and definition component 422 is configured to allow a user to select from among a plurality of different modes in which the enterprise security management tool can be used. For example, in a modeling mode (a default mode of the tool), a graphical user interface can be used to define security settings for export. However, a user may be presented with an option to switch to a simulation mode and/or a monitoring mode. In a simulation mode or monitoring mode, various tests can be run to verify consistency of security within the enterprise network, and alerts can be generated and graphically presented to a user to indicate areas of an enterprise network that are not secured, or for which unsecured traffic might be allowed to access data that is intended to be secured (either in a realtime or simulated situation, depending on the mode).

A security policy generation component 424 is configured to generate, based on the arrangement and settings defined using the configuration user interface of the enterprise security management configuration tool, to generate an exportable file that can be ingested by the management server 120 of FIG. 1, for population of the configuration database 122 and subsequent dispersion of security policy settings throughout the enterprise network. In example embodiments, the security policy generation component 424 can generate such a file based on all or part of a given project, for example by generating a file that updates security settings for an entire enterprise network, for one or more solutions, or one or more profiles. In specific embodiments, the file is constructed such that it is compliant with an application programming interface (API) exposed by the management server 120 for modifying security settings in the configuration database 122.

In the embodiment shown, the third party integration component 425 is configured to interface with one or more third party security software systems that may be used to implement security on third party networking devices via the communication interface 408. For example, the third party security software systems may manage security policies for a router or firewall which is used to manage access to a subnetwork within an enterprise network. That third party security software may be accessible via the third party integration component 425 which is configured to (1) include a definition of how to access third party software security policies for the one or more third party devices, and (2) translate the third party software security policies so that an overall security assessment can be provided for the enterprise network.

In an example implementation, third party networking devices can include third party firewall devices, such as those provided by Palo Alto Networks of Santa Clara, Calif. Such devices have a software management tool called Panorama which is used to define policies for such devices; however, the policies are described in terms of non-standardized networking object descriptions for, e.g., computing devices within the network, subnetworks, communication connections, etc. As such, a translation between those networking objects and those of the enterprise security management configuration tool allow for a unified view of enterprise security. This can be accomplished by managing mappings between such as a third party security server and the tool 412 in the configuration database as possible classifications. In a particular example, tables used to manage object types can be used and mapped to security zones, with an object_field panCreatedSolFirewallId used to identify the particular firewall serial number; there would be another object_field to identify the zone name (e.g., pancreatedSolZoneName). Additional details regarding operation of the third party integration component 425 are provided below in connection with FIGS. 6-25.

In example implementations the third party integration component 425 can be implemented in part by defining a third party device using a customized classification, with the subnetwork or portion of a network that is secured using the third party device being defined as a solution within the enterprise security management configuration tool. Still further, and based on the manner in which the third party device and software classifies other devices, a customized correspondence between those definitions and the logical descriptions of enterprise network devices in the enterprise security management configuration tool (e.g., nodes, profiles, solutions, channels, etc.) can be provided. Such customizations can at least in part be defined using a custom classifications feature of the enterprise security management configuration tool described in U.S. patent application Ser. No. 15/972,524, entitled "Custom Node and Profile Classifications for Enterprise Security Management Tool" (Attorney Docket No. TN659), the disclosure of which is hereby incorporated by reference in its entirety.

In the example of a firewall device from Palo Alto Networks, the Panorama security configuration software has a plurality of predefined categorizations for types of devices and networks; these devices and networks can be mapped, in the third party integration component 425, to a construct within the enterprise security management tool 412 using a plurality of integration rules 427. A complete mapping might be as follows (Enterprise Manager Terminology to Palo Alto Networks (PANW) Terminology):

Solution=Zone
Node=Addresses
Profile=Addresses/Address Groups
Channel/Flow=Security Policy Entry
Service~=Applications/Application Groups In further detail regarding the rules 427 providing correspondence to the third party security software, it is noted that the tool 412 generally manages solutions, nodes, channels/flows, services, and applications. In an example implementation, solutions are the equivalent to PANW Zones. Nodes have a direct mapping to PANW Addresses. There is the possibility that a PANW Address is a range of IP Addresses so the third party integration component 425 will convert that range to individual IP Addresses. In addition, profiles have a direct mapping to PANW Address Groups. Channels/Flows have a mapping to the PANW Security Policies.

In addition, services have a rough mapping to Application and Application Groups; in that Applications contain services. For example, if any of the port/protocol combinations exist as services, those services would be created within the tool 412 as a custom defined service with the name of the application.

In addition, unique identifiers for objects internally within the tool 412 will be mapped to the firewall serial number and the name of the PANW object to ensure uniqueness. This will not likely be visible to a user, but rather managed for object tracking purposes.

It is generally noted that firewall policies are generally an ordered list of entries that are accessed/compared when traffic reaches a firewall. Accordingly, firewall rules are applied in order to ensure that if a policy overrides an entry below that matches, the correct policies are applied to the flows in the tool 412. Furthermore, although the Panorama took defines source/destination, the tool 412 defines a consumer/provider, and can be correlated. Additionally, configurations in Panorama are converted, using a set of translations of detailed rules. These rules are the general equivalents of channel policies in the tool 412, as are discussed in further detail below. However, by way of example, a possible listing might appear as follows for an LDAP application within PANW:

tcp/389,3268,3269,636
    udp/389,3268

These translate directly to flows received by each channel. In another example, the PANW "activedirectory" application may have the following ports defined tcp/1025-5000
    tcp/135,138,139,389,445,464,636
    tcp/49152-65535
    tcp/5722,9389
    udp/88,123,137,138,389,445,464,2535

In this case, the first (and third) entry is a port range. For the mapping between the enterprise security configuration tool and the third party security software (in this case PANW), port ranges are ignored so only the following Flows are created tcp/135,138,139,389,445,464,636
    tcp/5722,9389
    udp/88,123,137,138,389,445,464,2535

Also with the policy, the third party integration component 425 will be configured to assess the "Action" field within a PANW security configuration, e.g., to know whether the policy is a block vs. allow and set the appropriate policy on the flow.

Additionally, as with the database tracking of correspondence between objects described above, services can be defined in the database for each flow object. For example, an identifier for the application providing data is the application name and firewall serial number, and this is stored in the object value table. This allows a user to display the application name or firewall serial number (e.g., as in FIGS. 25-27, below) for display in a user interface.

In some embodiments, rather than accessing a networking device itself, the tool 412 and in particular third party integration component 425, can be configured to inquire of a third party management tool what firewalls may be present, rather than directly detecting the presence of such firewalls in network traffic data. Such information can be obtained from configuration files in a third party management tool, e.g., as illustrated further below. In such example embodiments, user credentials can be logged and stored in the tool 412 to allow exchange of data between the tool 412 and the third party software, so that the tool may be notified or may monitor for changes in configuration in the third party software. In example embodiments, a fetch or node-rest-client configuration can be used, with the tool 412 acting as a client of the third party tool for purposes of detecting firewalls.

In the embodiment shown, the memory 404 can be configured to also store project data 426, concordance data 428, and security policies 430. This information generally represents the input, current state, and output of the enterprise security management tool as to one or more projects managed using that tool. Specifically, concordance data 428 can correspond to information regarding the identity and interactions of various endpoints and servers within an enterprise network. In some examples, a flow consists of a service having a consumer/provider relationship, defining a "friendship" between two nodes. In example embodiments, the concordance data, defining such flows and friendships, can include network logs captured at one or more endpoints, such as is discussed below in connection with FIG. 5. The project data 426 corresponds to a current state of a project, including any profiles (logical groupings of nodes), solutions (logical groupings of profiles), channels (communications detected between/among nodes and/or profiles), and/or any settings associated therewith, for example filter rules, security enablement/disenablement, or other security-based settings capable of being deployed by the management server 120. The security policies 430 correspond to the data output from the enterprise security management configuration tool, for ingestion by the management server 120.

Figure 5:
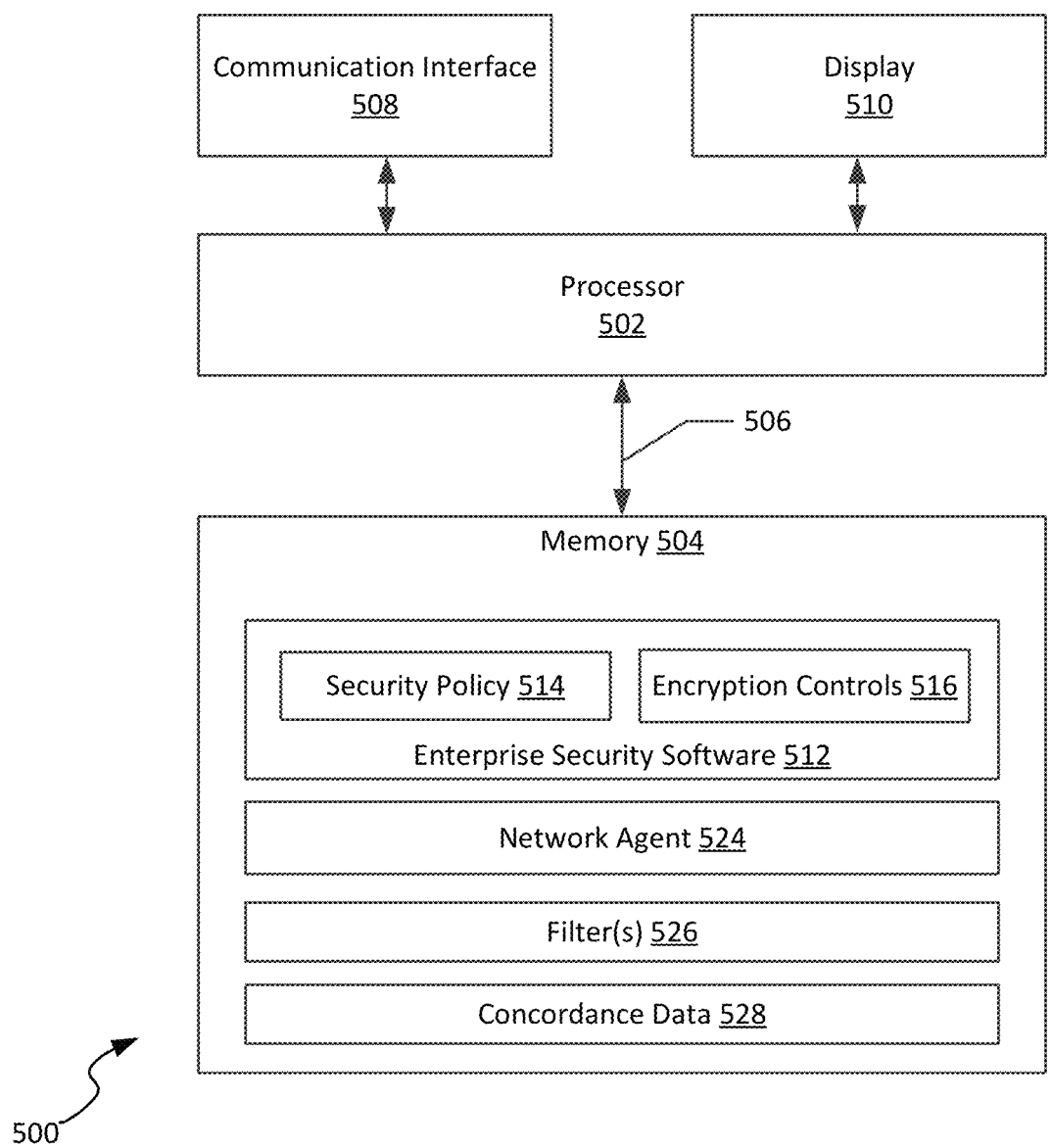
FIG. 5 is a schematic illustration of an example computing system useable within the enterprise network for which a security configuration can be deployed.

FIG. 5 is a schematic illustration of an example computing system 500 useable within the enterprise network for which a security configuration can be deployed using the enterprise security configuration tool 412. In general, the computing system 500 includes a processor 502 communicatively connected to a memory 504 via a data bus 506. The processor 502 can be any of a variety of types of programmable circuits capable of executing computer-readable instructions to perform various tasks, such as mathematical and communication tasks, such as those described above in connection with FIG. 3. The memory 504 can include any of a variety of memory devices, such as using various types of computer-readable or computer storage media, as also discussed above. In the embodiment shown, the memory 504 stores enterprise security software 512 and a network agent 524. The computing system 400 can also include a communication interface 508 configured to receive and transmit data, for example to interact with other nodes within or external to an enterprise network. Additionally, a display 510 can be included for user interaction.

The enterprise security software 512 is configured to control security in storage of data at and communication of data at the computing system 500, and between that system and remote systems. The enterprise security software includes a security policy 514 and encryption controls 516. The security policy 514 and encryption controls 516 can include settings as defined by an enterprise security management policy set at a management server, such as management server 120, which are received as filters 526. Details regarding deployment and use of such enterprise security software are provided in U.S. patent application Ser. No. 14/688,348, entitled "Enterprise Management for Secure Network Communications over IPSec" (Attorney Docket No. TN625), the disclosure of which was previously incorporated by reference, as well as U.S. patent application Ser. No. 14/753,120, entitled "Secured Networks and Endpoints Applying Internet Protocol Security" (Attorney Docket No. TN623), and U.S. patent application Ser. No. 14/753,146, entitled "Secure Network Communications in a Mobile Device over IPsec" (Attorney Docket No. TN624), each assigned to Unisys Corporation of Blue Bell, Pa., the disclosures of each of which are hereby incorporated by reference in their entireties.

The network agent 524 is, in the embodiment shown, a network traffic monitor installed at the computing system 500 and configured to collect concordance data 528. In an example implementation, the concordance data 528 can correspond to network traffic data seen at the computing system 500, and can be uploaded to an enterprise security management configuration server for use as concordance data to determine, along with concordance data from other computing systems (nodes) within the enterprise network, affinities and communication channels among those nodes. In example embodiments, the network traffic can be captured in the form of a PCAP file containing network traffic at the computing system 500.

Figure 6:
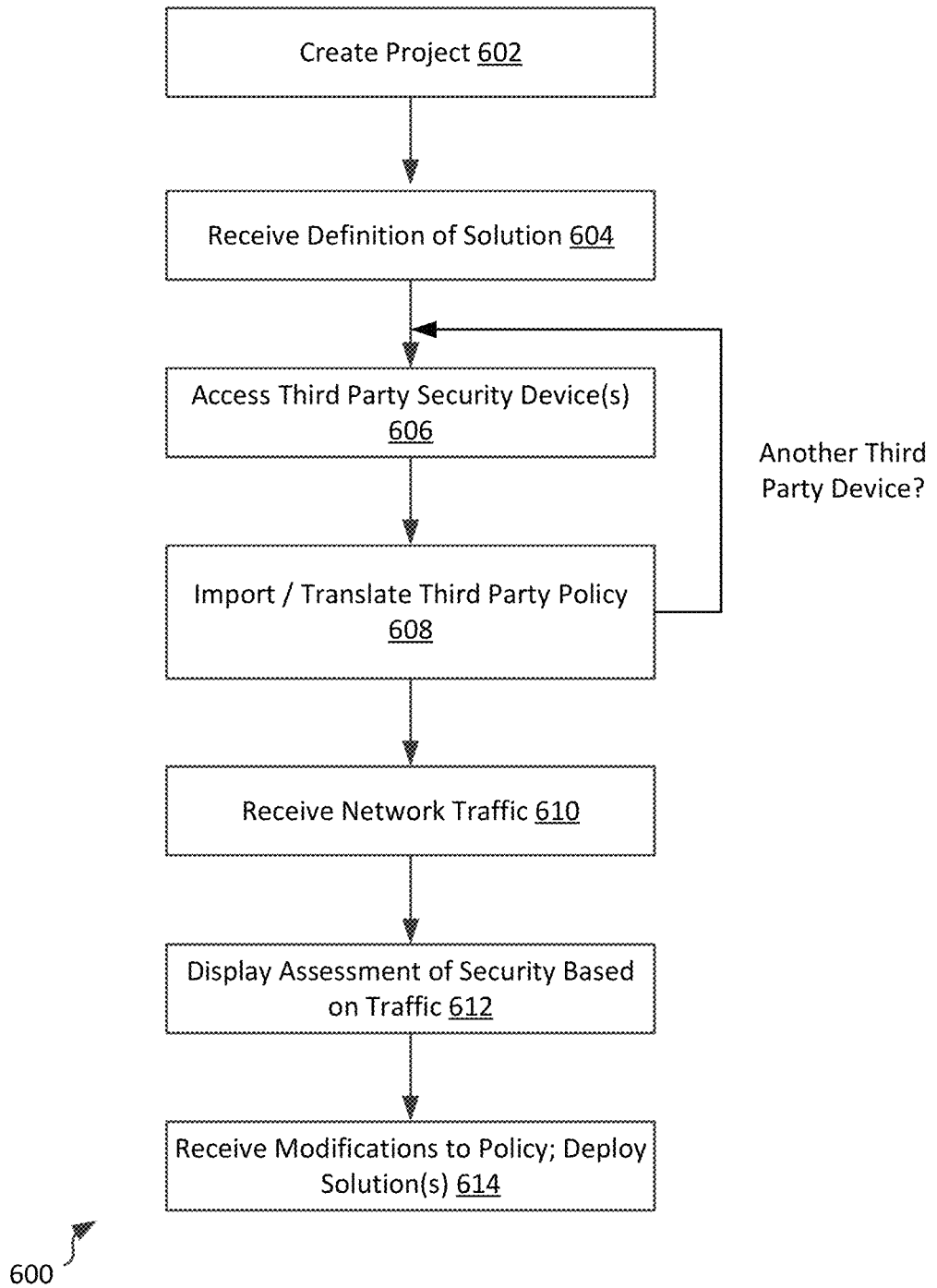
FIG. 6 is a flowchart of a method for configuring security management settings within an enterprise network including third party network management software, according to an example embodiment of the present disclosure.
Figure 7:
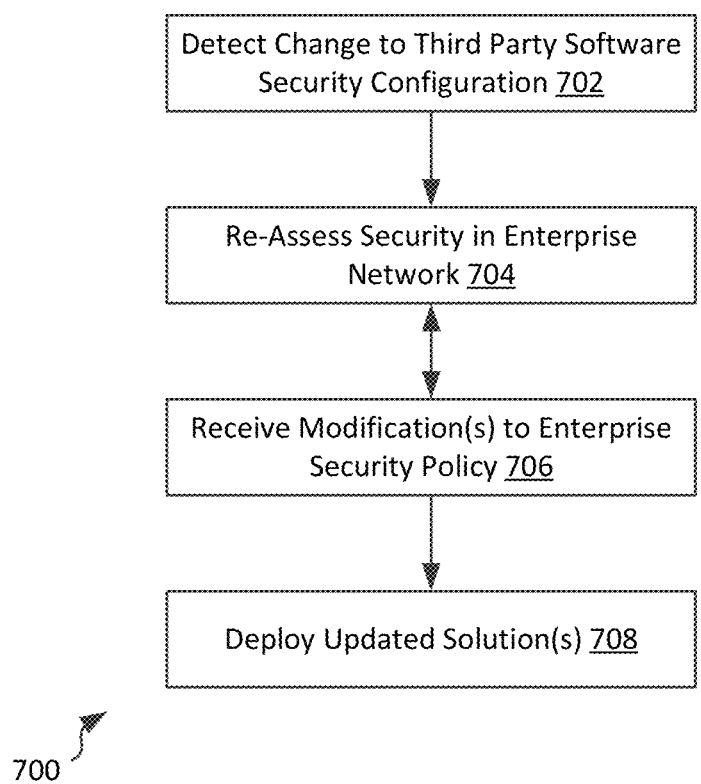
FIG. 7 is a flowchart of a updating security management settings in response to security setting changes in third party network management software, according to an example embodiment.

II. Third Party Security Software Integration with Enterprise Security Management Configuration Tool Referring now to FIGS. 6-25, methods and systems are described for integration with third party security software for management of third party networking devices within an overall enterprise network. FIG. 6 illustrates a general method of managing integration of enterprise security configuration tool with third party security software used in managing a third party networking device. FIG. 7 illustrate a method of managing updates to an enterprise security assessment in response to changes in configuration at a third party networking device. FIGS. 8-27 represent example user interfaces of an enterprise security management configuration tool that can be used to implement aspects of the present disclosure.

Figure 8:
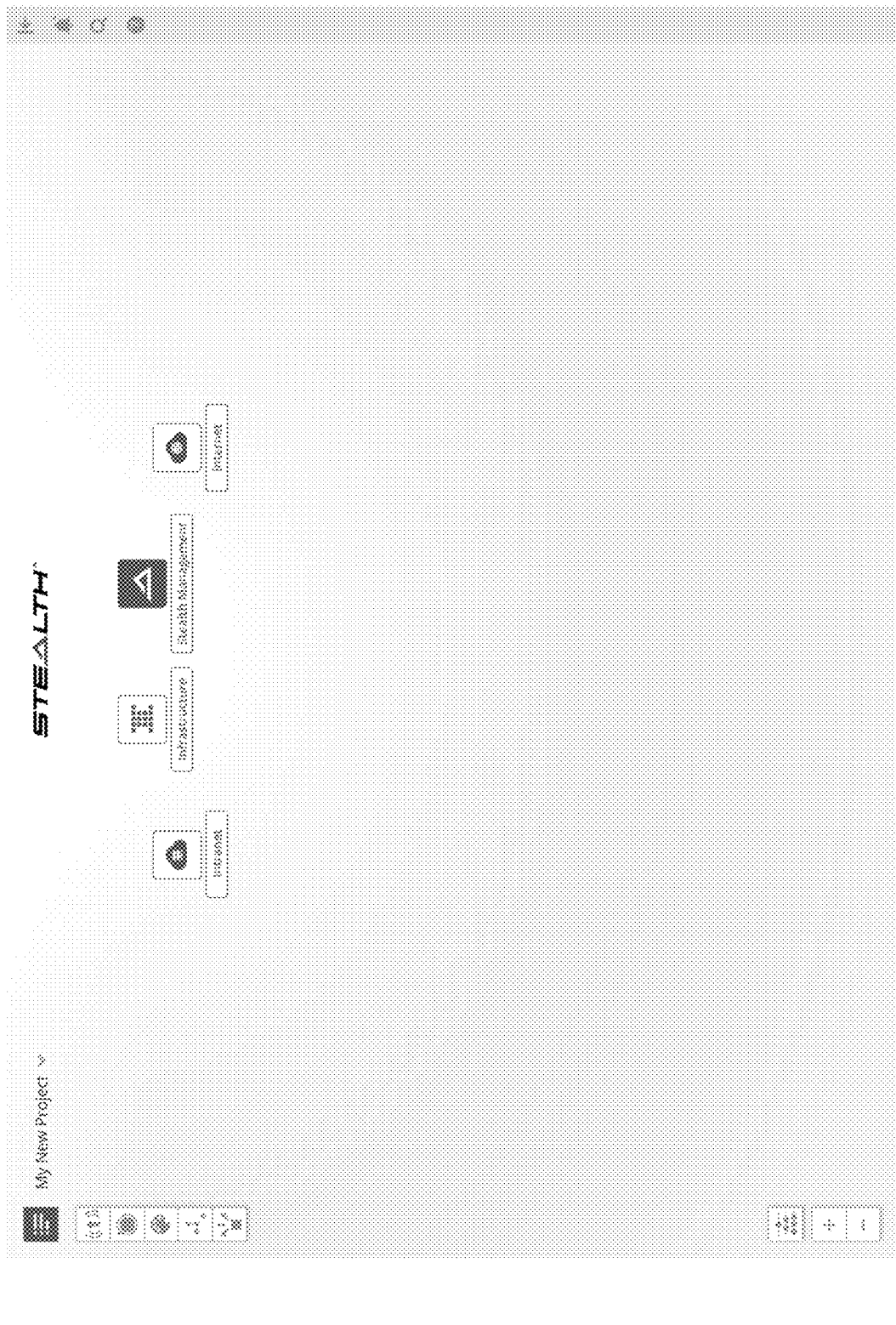
FIG. 8 is a user interface of an enterprise security management configuration tool useable to define one or more enterprise security solutions, in an example implementation.
Figure 9:
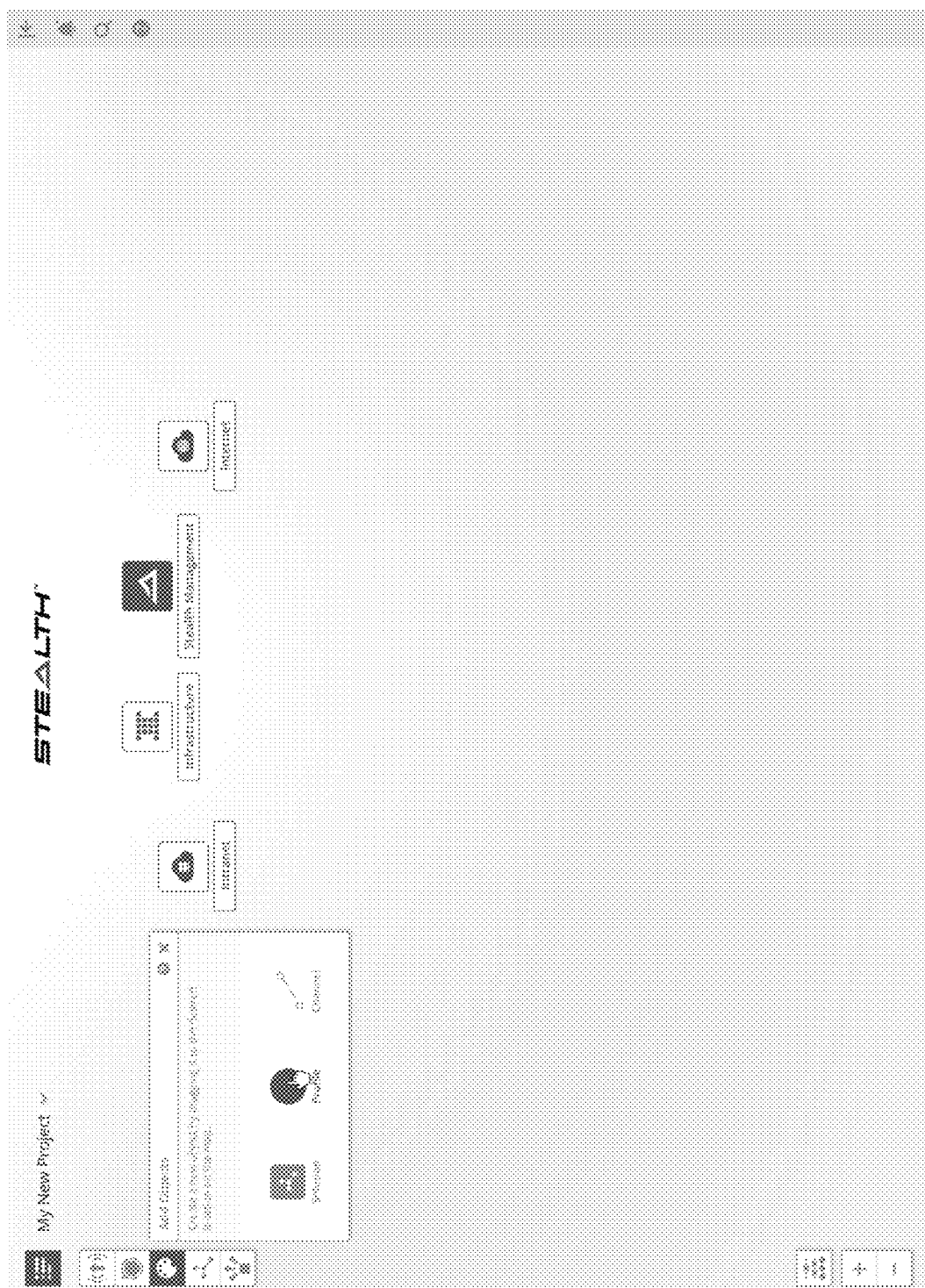
FIG. 9 is a user interface of the enterprise security management configuration tool useable to define one or more enterprise security solutions, in an example implementation.
Figure 10:
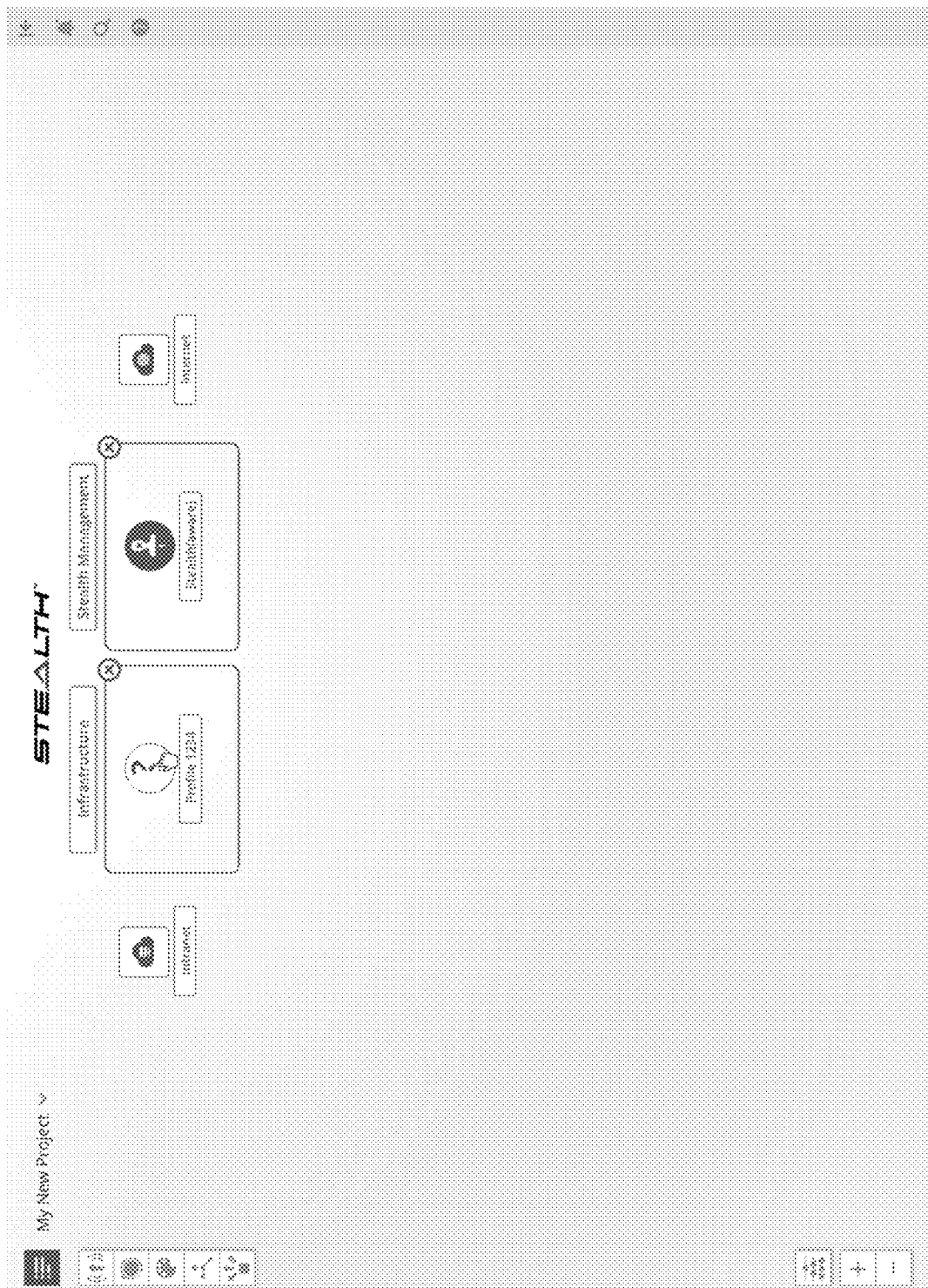
FIG. 10 is a user interface of the enterprise security management configuration tool useable to define one or more enterprise security solutions, including a custom solution for a third party networking device, in an example implementation.

Referring first to FIG. 6, a method 600 of managing integration of an enterprise security management configuration tool with third party security software is illustrated. The method 600 includes creating a project within an enterprise security management configuration tool (step 602), as illustrated in FIGS. 8-9. The method further includes receiving, within the enterprise security management configuration tool, a definition of a third party networking device to be configured within an enterprise network (step 604). The definition of the third party networking device can be based on discovery of such a device in response to connection to third party security software, or direct discovery of such a device. An example of such definition is illustrated in FIGS. 10-14.

Figure 15:
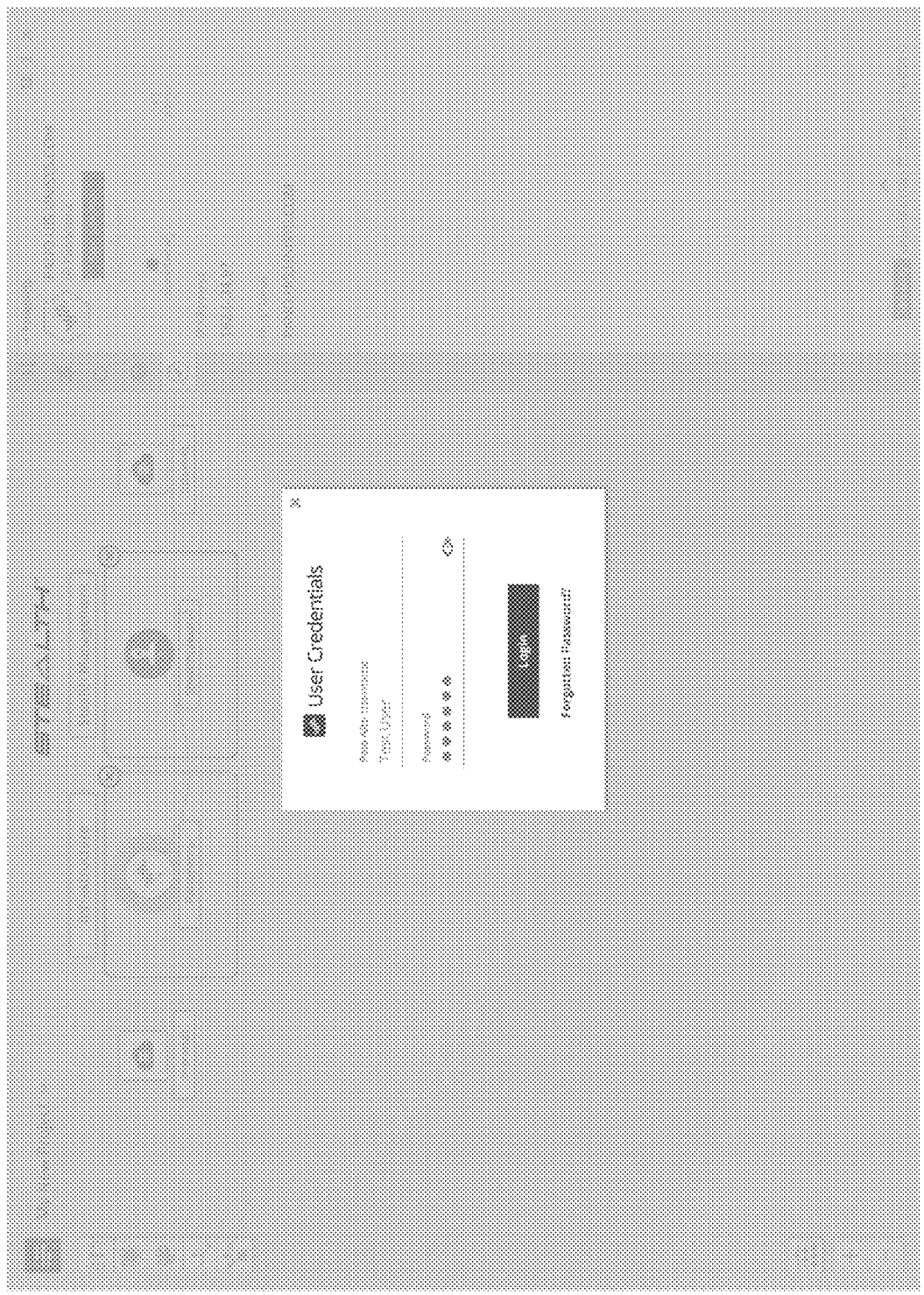
FIG. 15 is a user interface of the enterprise security management configuration tool useable to enter access credentials for a third party security software used to manage a third party networking device, in an example implementation.

In the embodiment shown, for each defined third party networking device, the third party networking device is accessed to obtain information regarding the security policy applied at that device by third party security software (step 606). As noted above, this may include, e.g., providing a network address for the third party networking device or otherwise identifying the device, as well as providing access credentials for such a device, as seen in FIG. 15. In an example embodiment, this information can be obtained via a call to the third party networking device or a server controlling the third party networking device via an Application Programming Interface (API) exposed by that server or device. In example embodiments, the third party interface component will obtain security policy information by enforcing a particular order for the operations to ensure proper translation. It is noted that there may be a number of specific API calls, depending on the third party devices or API used, that are required to obtain security policy information.

Figure 16:
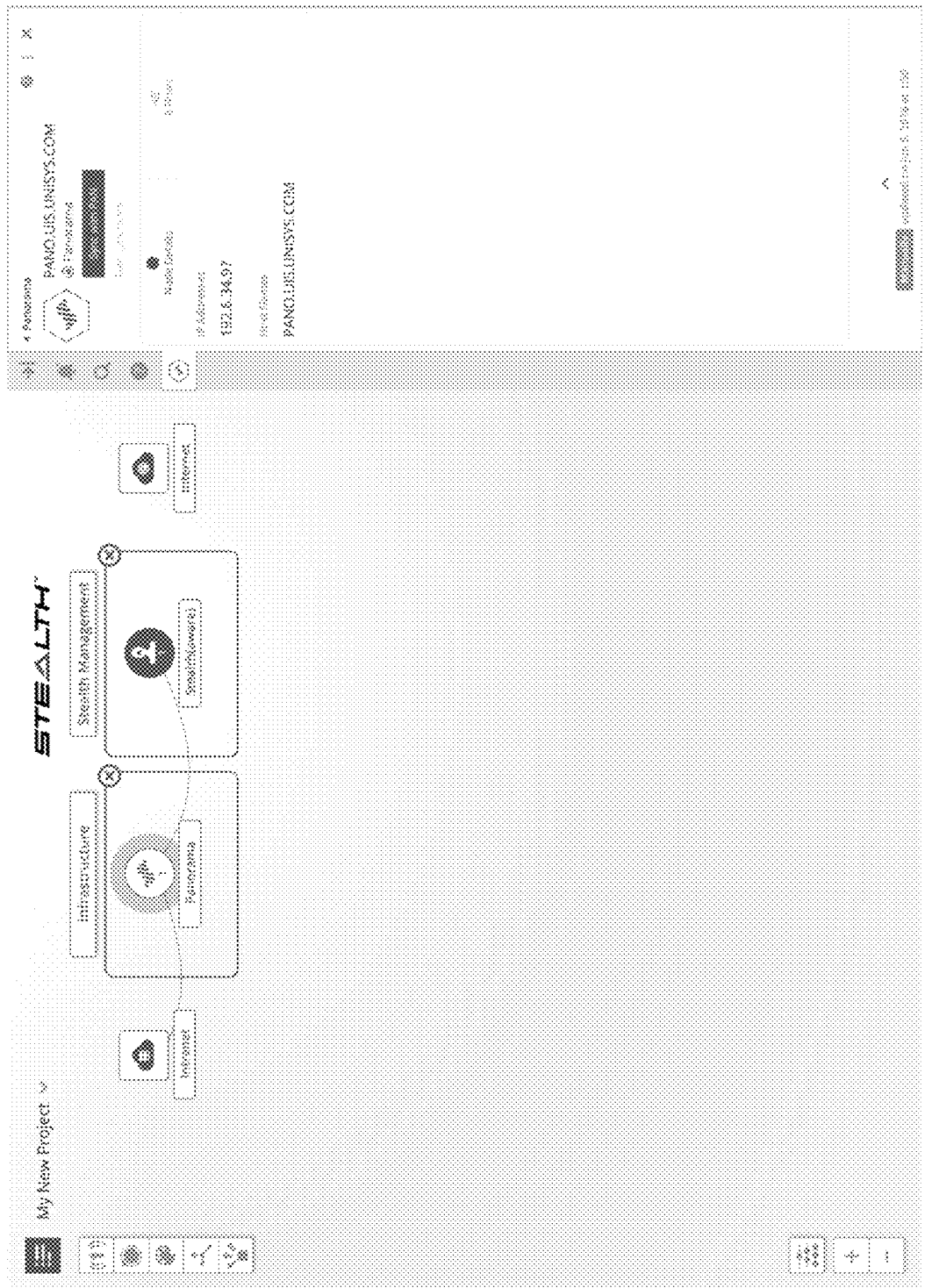
FIG. 16 is a further user interface of the enterprise security management configuration tool showing connectivity to the third party networking device, in an example implementation.
Figure 17:
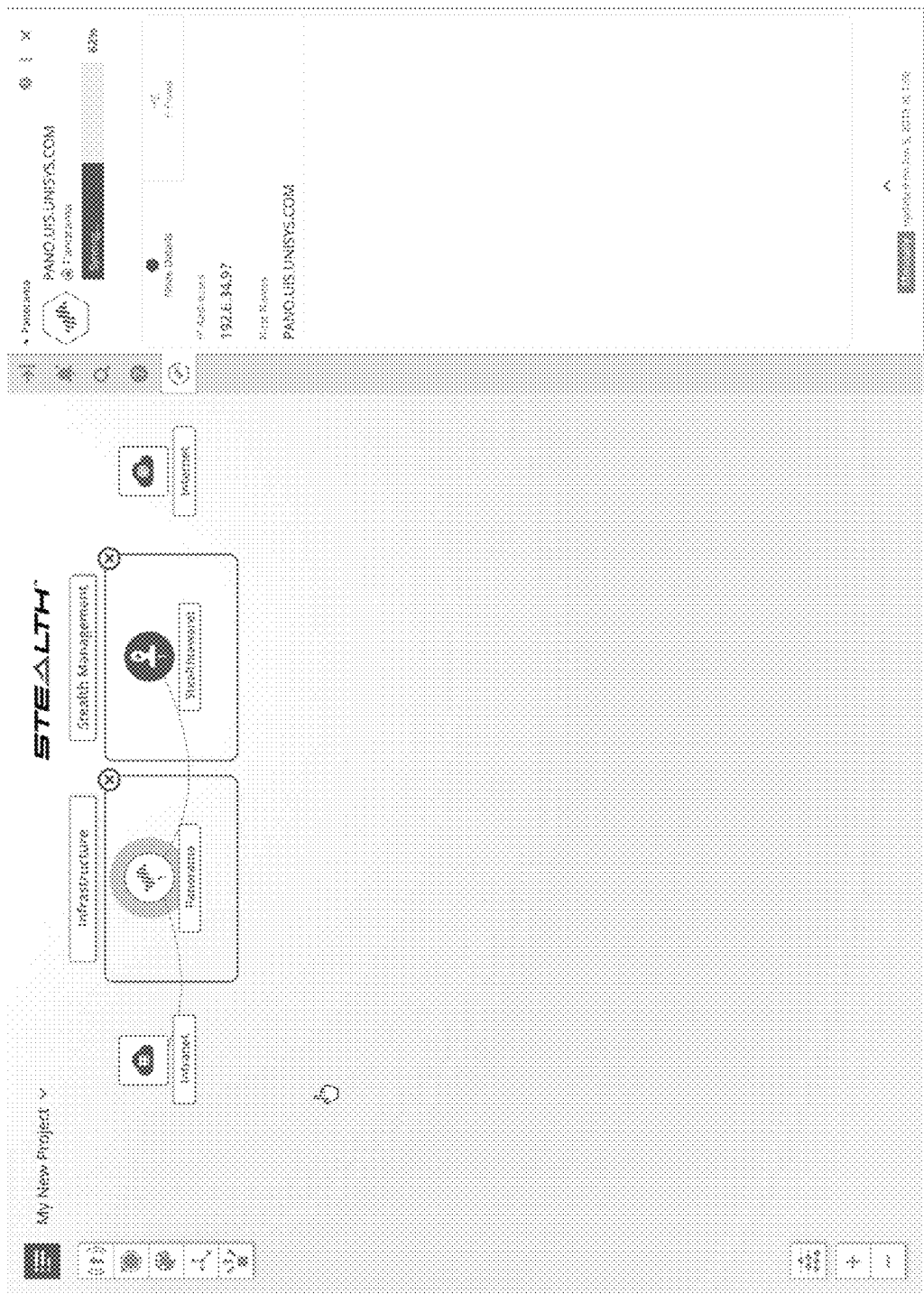
FIG. 17 is a further user interface of the enterprise security management configuration tool showing import of settings from the third party networking device, in an example implementation.
Figure 18:
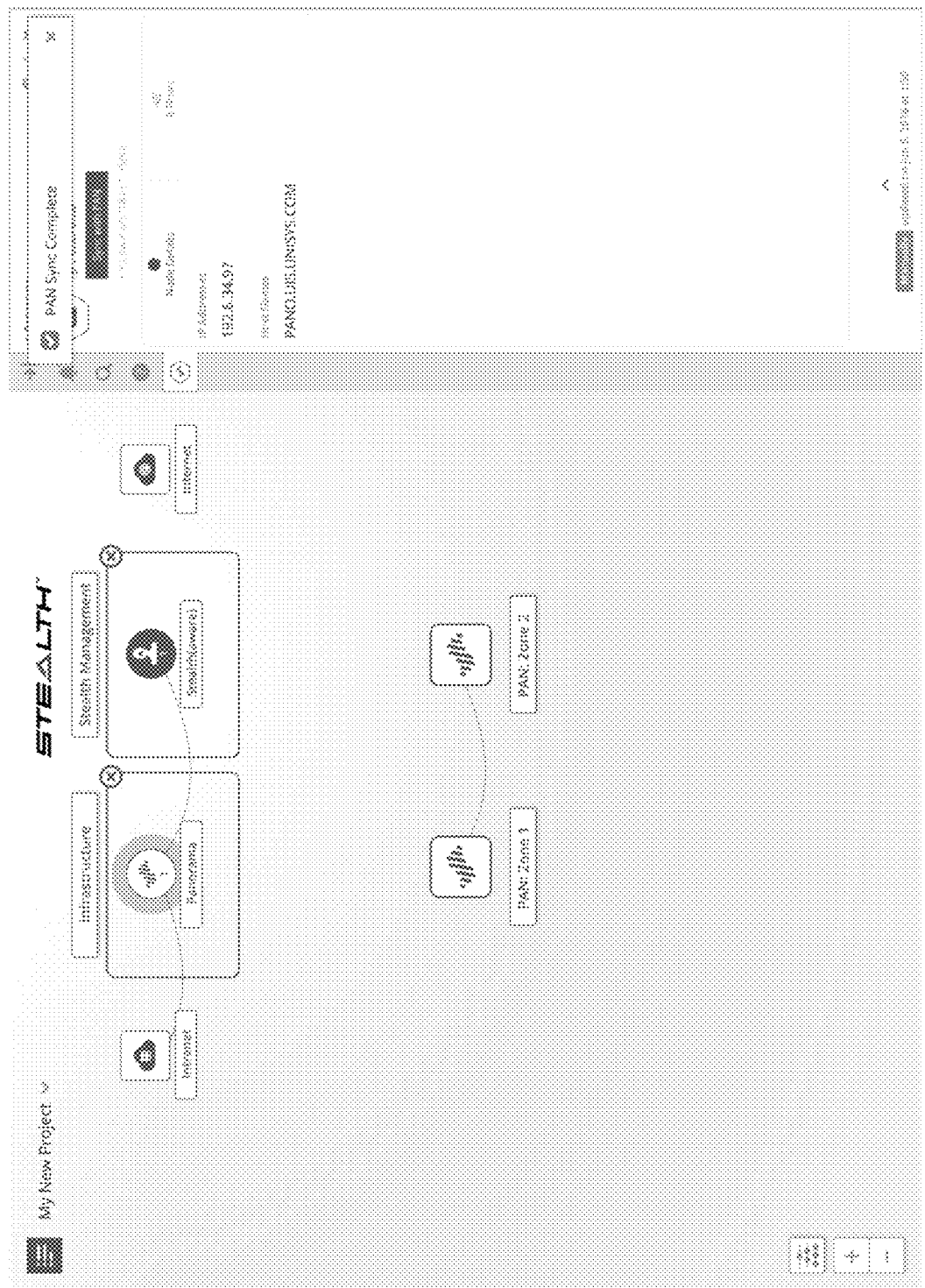
FIG. 18 is a further user interface of the enterprise security management configuration tool showing completed import of settings from the third party networking device, in an example implementation.
Figure 19:
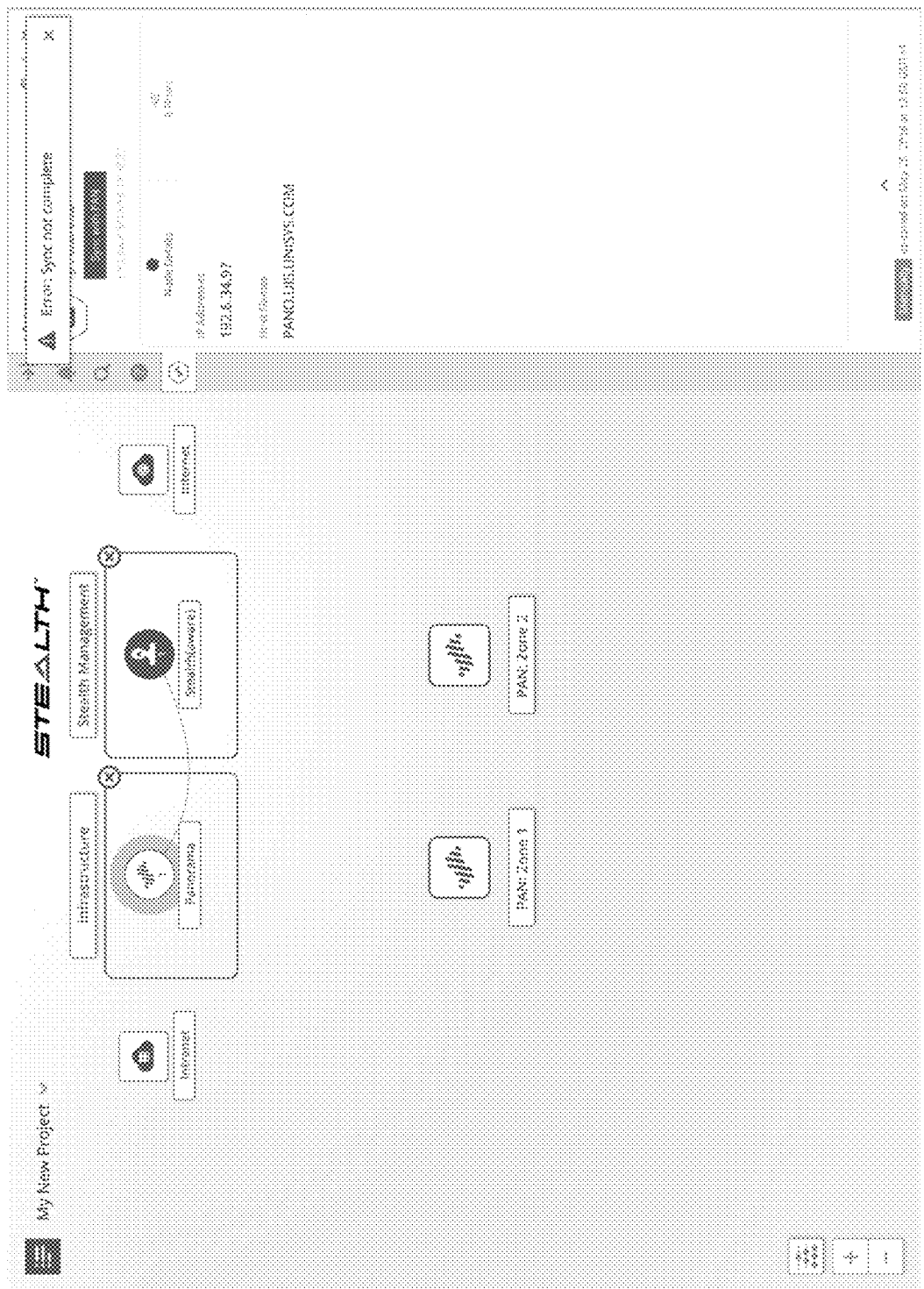
FIG. 19 is a further user interface of the enterprise security management configuration tool showing incomplete or aborted import of settings from the third party networking device, in an example implementation.

Once connected to the third party networking device, device configuration information can be retrieved, as in FIGS. 16-18, including third party policy information (step 608).

It is noted that, particularly in the event there is no centralized third party security software, each third party networking device that is discovered within the enterprise network is accessed and configuration information is obtained. Accordingly, steps 606-608 may occur iteratively or in parallel for each third party networking device.

When device configuration information is retrieved, one or more solutions can be defined based on the configuration provided in the device configuration information. Furthermore, a user may, using user interfaces such as those seen in FIGS. 20-21, view and modify security policy settings within various regions of an enterprise network, including regions for which security is managed using a third party networking device (e.g., firewall) and associated management software, and regions for which security is managed using the enterprise security management configuration tool.

Figure 20:
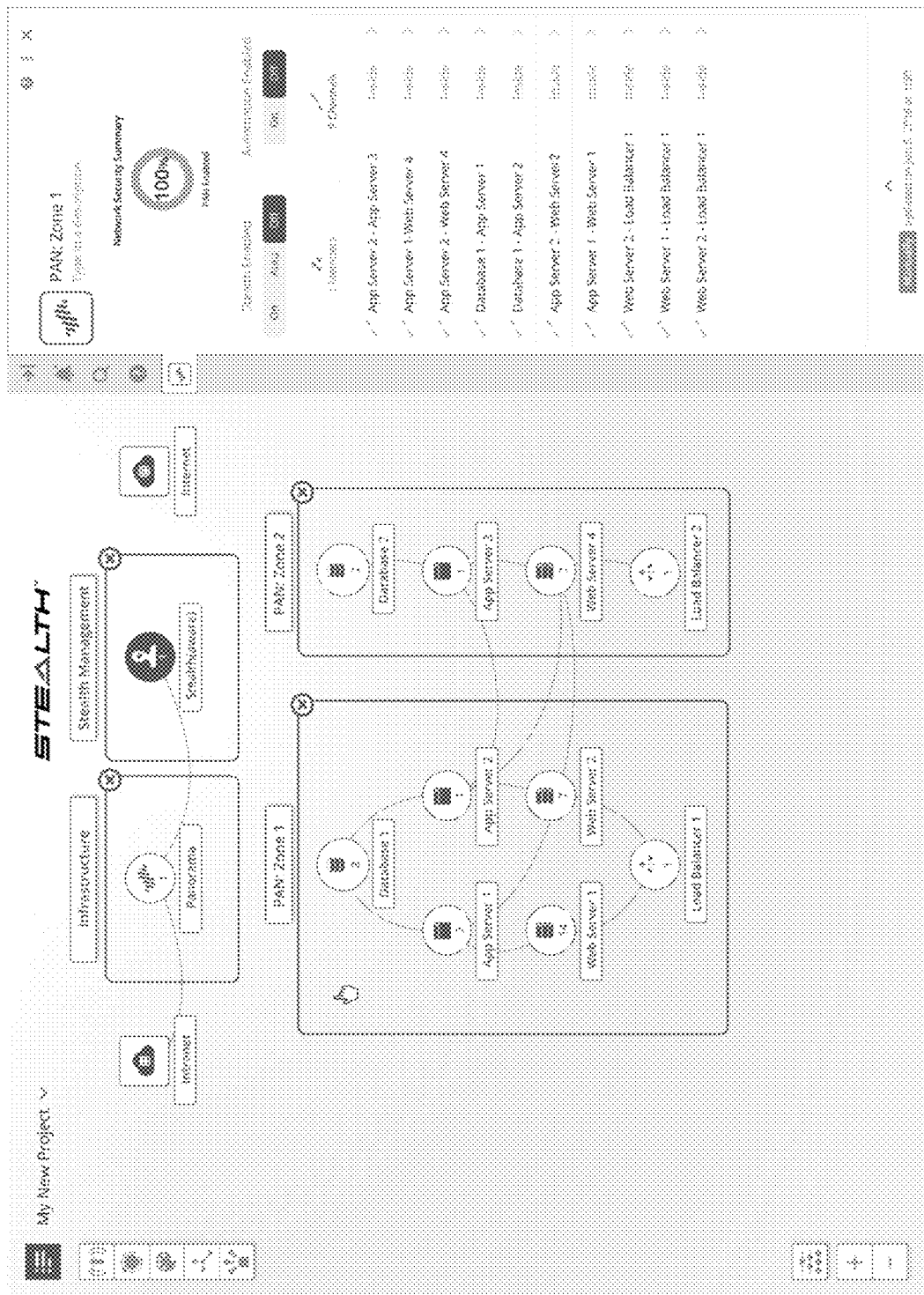
FIG. 20 is a further user interface of the enterprise security management configuration tool showing an overall assessment of network security coverage, in an example implementation.
Figure 21:
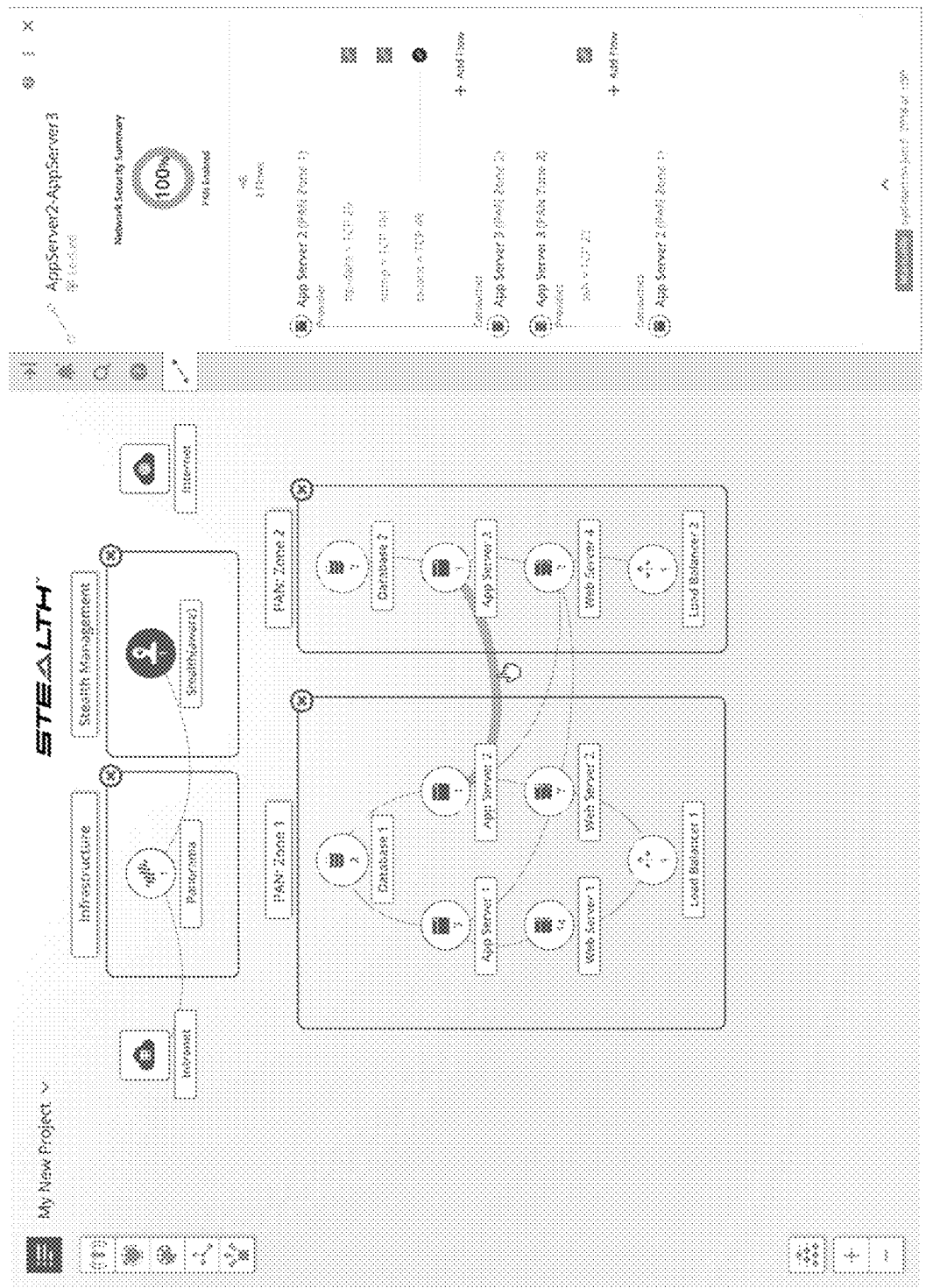
FIG. 21 is a further user interface of the enterprise security management configuration tool showing an overall assessment of network security coverage and details regarding channel communications between portions of the enterprise network, in an example implementation.

In some embodiments, network traffic data can be imported into the enterprise security management configuration tool as well, and an effect of network traffic assessed. For example, and as seen in FIG. 6, network traffic data is acquired (step 610), e.g., from PCAP data captured from various devices such as discussed above with respect to FIG. 5. That data can be mapped to the graphical depiction of the enterprise network, e.g., as seen in FIGS. 20-21, to determine the extent to which network traffic is secured (step 612). In an example embodiment seen in FIG. 23, a security assessment is provide, indicating a percentage of traffic managed by third party networking devices and policies, and a percentage of traffic whose activity is uncontrolled by those third party networking devices. In some cases, specific flows on communication channels (e.g., application traffic) between nodes in the enterprise network can be labeled "good" or "bad" based on a level of security provided on those channels, or otherwise whether that traffic is accounted for as being generated by particular, tracked application software. This may particularly be the case for channels extending between portions of the network that are secured by a third party networking device (e.g., behind a managed firewall) and other portions that are not similarly secured (e.g., are not behind the same firewall). Example of this are seen in FIGS. 24-27.

In some instances, a user may elect to modify one or more enterprise-wide security policies (e.g., to account for otherwise uncontrolled communications). For example, a user may select to modify one or more policy parameters for nodes outside of the region managed by the third party security software; those modifications may then be re-assessed relative to the network traffic and an updated assessment provided to determine overall coverage (step 614). For example, as seen in FIGS. 24-27, specific security settings may be adjusted in a user interface to allow for improved security in areas that are otherwise unsecured by the third party security software.

Referring to FIG. 7, a method of managing updates to an enterprise security assessment is provided. The method 700 can be performed by the enterprise security management configuration tool, e.g., in response to detecting a change to a configuration at third party security software. In the example shown, a change is detected at third party security software (step 702). This can include receiving, via a web hook to the third party security software, a determination of at least one change. In response to the change, the overall enterprise network may be re-assessed, e.g., based on previously-received concordance data (network traffic data) (step 704). This may result in an updated assessment, which can take the form of a changed percentage of overall traffic covered by a security policy. In some embodiments, new network traffic data can be received and reprocessed in response to detecting the change in security settings at the third party security software as well.

In the example shown, the method 700 includes receiving a modification to an enterprise security setting (step 706). The modification to the enterprise security setting can be made, e.g., by an administrative user of the enterprise security management configuration tool. Upon application of the modification, the software may be reassessed iteratively, until an adequate security assessment is reached (e.g., to the satisfaction of the administrative user). At that time, the user may elect to, e.g., deploy the solution to an enterprise management server, for deployment across the enterprise network (step 708).

Referring to FIGS. 6-7 generally, it is noted that the method and structures for integrating third party security software, and overlaying security settings from various sources, provides a number of advantages. In particular, it allows a user of an enterprise security application to use features of certain networking equipment without being tied to, e.g., (1) manually ensuring that security is correct for data flows between portions of an enterprise network, (2) using a single networking device provider across an entire enterprise network, or (3) placing all computing resources behind a particular type of third party networking equipment. Rather, the user can selectively deploy networking and security devices within an enterprise network, view an overall security scenario across the enterprise network (rather than only the secured portions) within a single tool, and modify security policies within, outside, or crossing boundaries of such third party software and networking devices. Other advantages are apparent as well from the present disclosure.

Referring now to FIGS. 8-27, a series of user interfaces are provided that illustrate an example implementation of the third party security software integration discussed above.

FIG. 8 illustrates a user interface 800 of the enterprise security management configuration tool (e.g., tool 412) in which a project is defined, which can include a plurality of solutions. In the example shown, an Internet solution, an Infrastructure solution, a Stealth Management solution, and an Intranet solution are shown. FIG. 9 illustrates a further user interface 900 including an add objects toolbox, where a user may elect to add a profile, as shown. Upon adding the profile, the user may place the profile within a solution (e.g., within the Infrastructure solution as seen in the user interface 1000 of FIG. 10).

Figure 11:
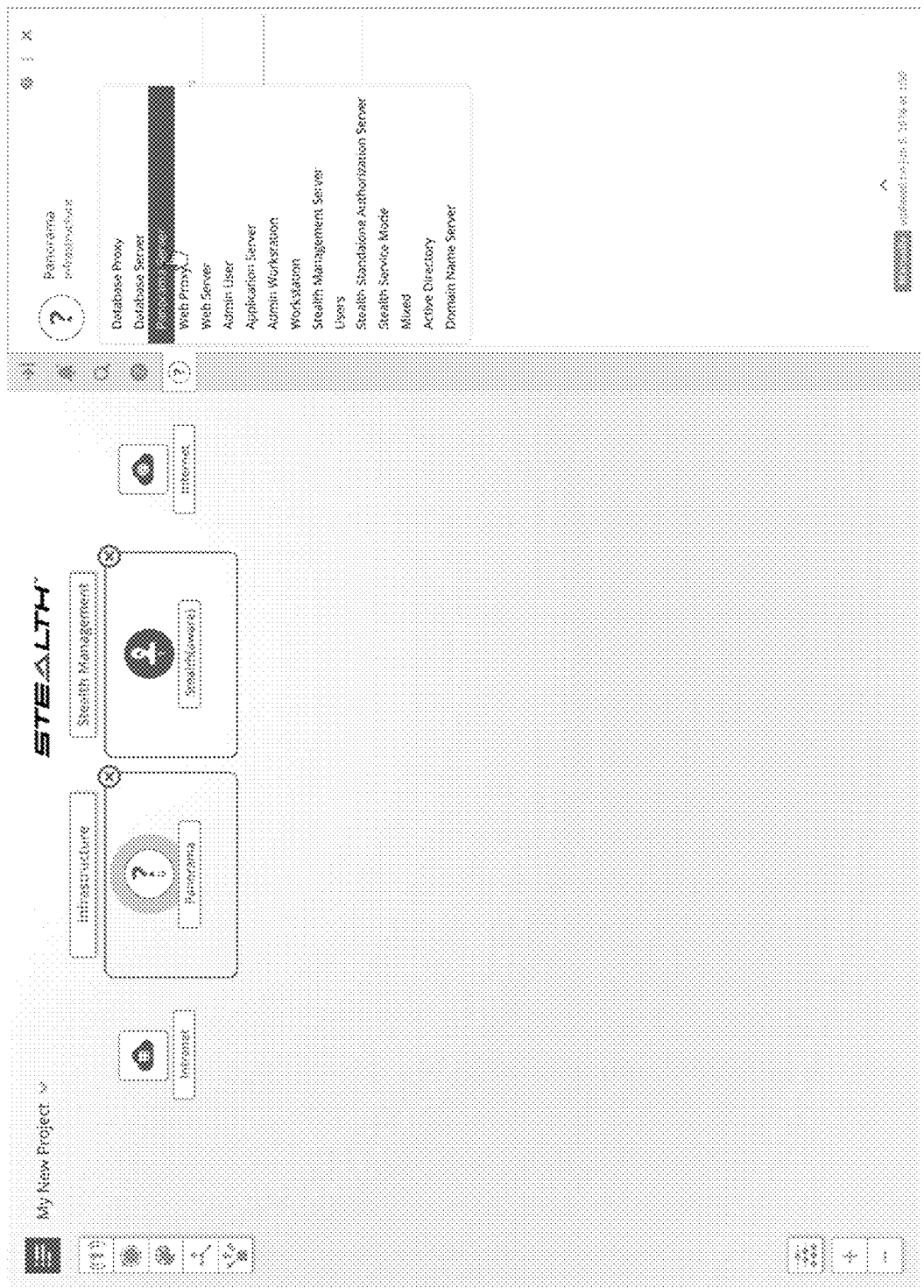
FIG. 11 is a user interface of the enterprise security management configuration tool useable to select a type of third party networking device, in an example implementation.

In the example seen in FIG. 11, a user interface 1100 is depicted that allows a user to select a type of object to associate with the selected profile. In the example shown a "Panorama Server" is selected. However, other types of third party security devices could be included within the list of types of profiles. This can be accomplished through custom classifications of profiles, as noted previously.

Figure 12:
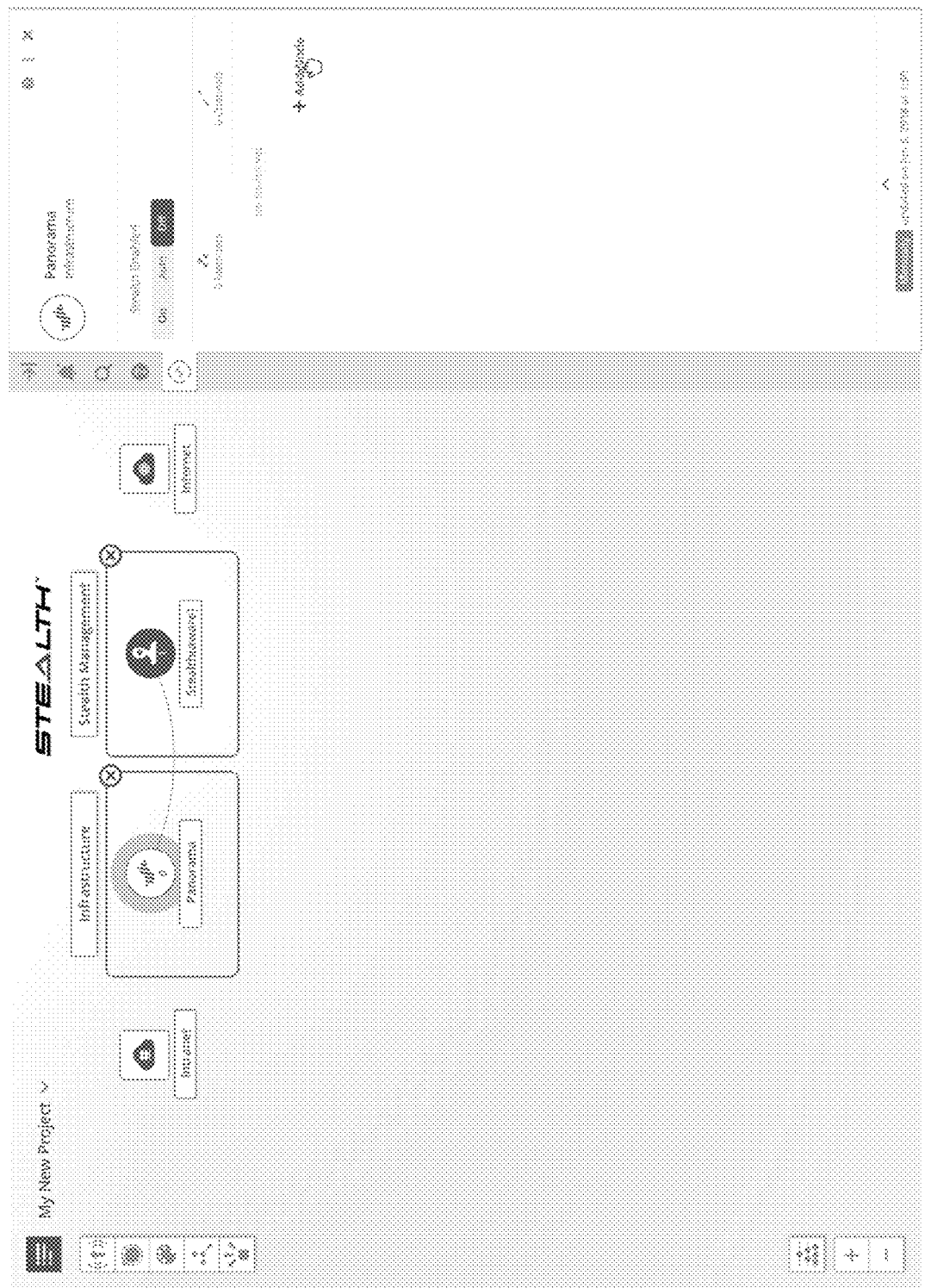
FIG. 12 is a user interface of the enterprise security management configuration tool useable to selectively enable enterprise-wide security within a subnetwork managed by a third party networking device and third party security software, in an example implementation.
Figure 13:
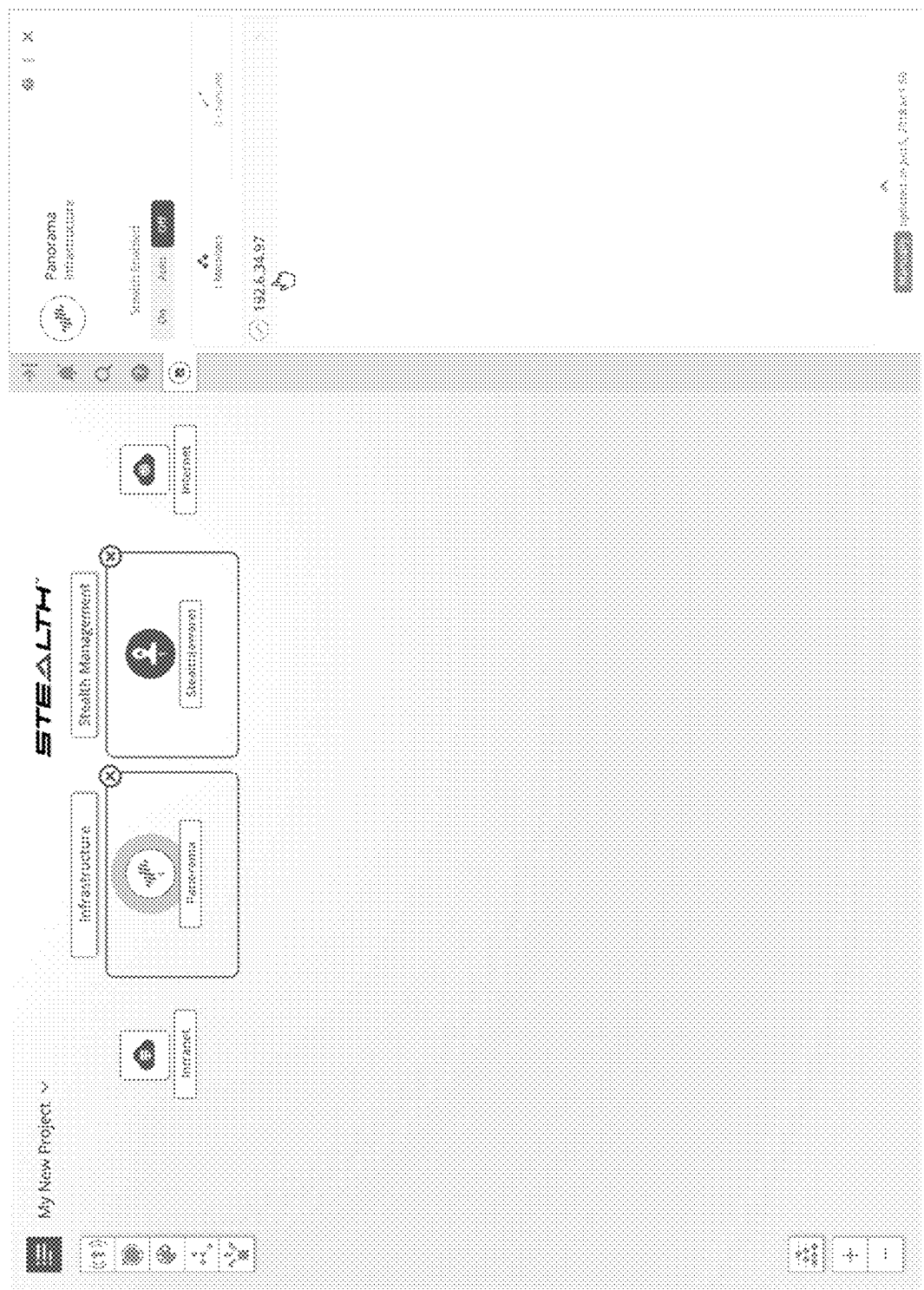
FIG. 13 is a further illustration of the user interface of FIG. 12 in which configuration details can be entered, according to an example implementation.
Figure 14:
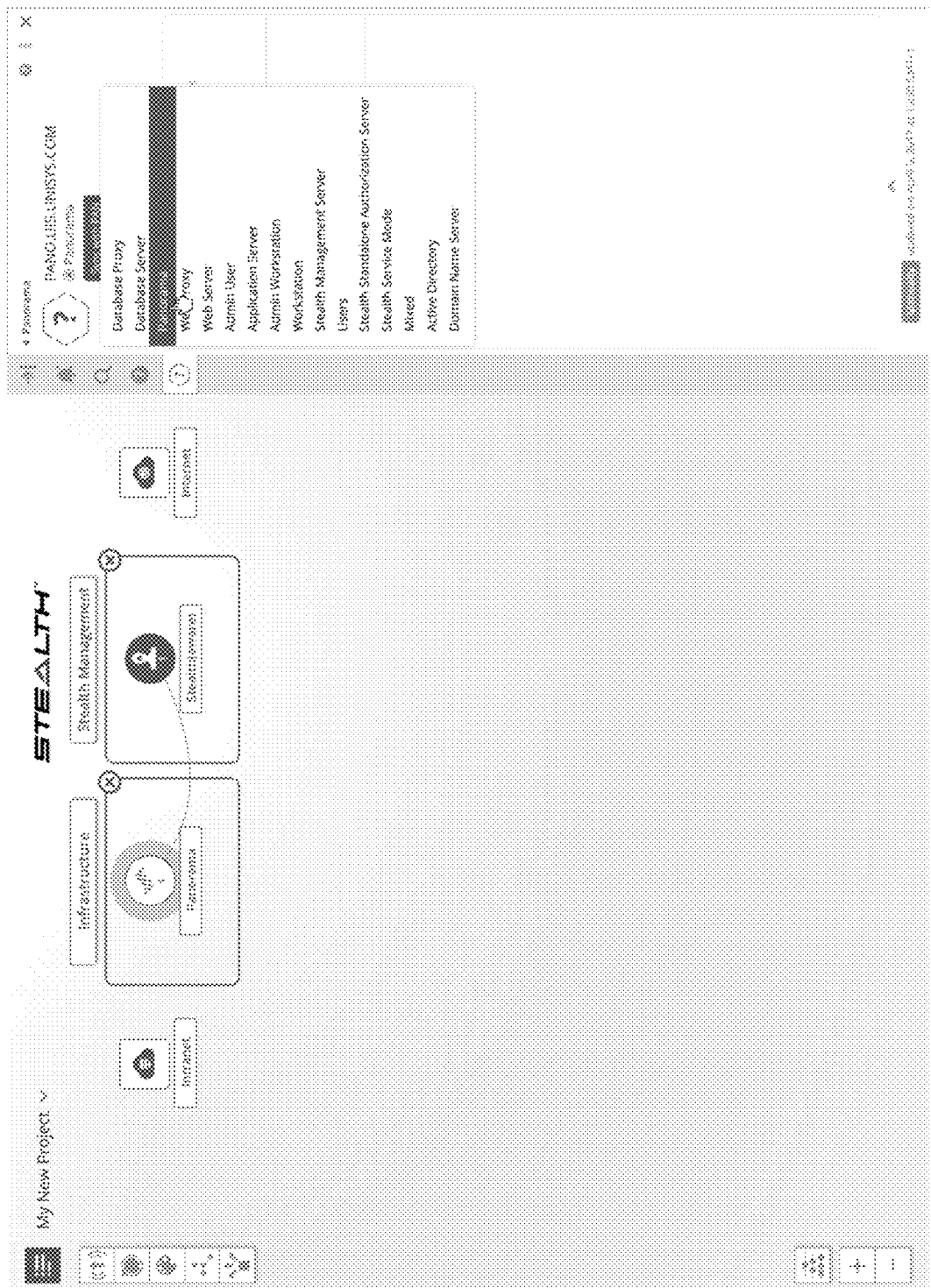
FIG. 14 is a further user interface of the enterprise security management configuration tool useable to select a type of third party networking device, in an example implementation.

Once a third party security device profile is selected, a user interface 1200 seen in FIG. 12 is displayed. In this example, the "Panorama" profile was selected, and the user can select to add a node to that profile. In the example seen in FIG. 13, a user interface 1300 may allow a user to define a location of a node that is to be included within the profile. The location may be, for example, an IP address of a third party networking device that has been discovered, either by the enterprise security management configuration tool or by communication with a third party server software for managing security in third party networking devices. The user may then select the type of node to be associated with the profile (in the case of the user interface 1400 of FIG. 14, a "Panorama" type is selected).

As illustrated in FIG. 15, a user may then be prompted to enter authentication credentials to allow the user to access security settings of the defined node (in this case, a Panorama-managed firewall). FIG. 16 illustrates a user interface 1600 displayed upon connection to the node. The user interface 1600 includes a selection option to synchronize the enterprise security management configuration tool with the settings defined in that third party networking device (e.g. in this case "Sync with PAN"). Upon selection, a status user interface 1700 is displayed in FIG. 17, ultimately illustrating completion of synchronization with user interface 1800 of FIG. 18. If, on the other hand, synchronization does not complete or an error occurs, an error notification is displayed, such as in the user interface 1900 of FIG. 19.

As seen in the user interface 2000 of FIG. 20, an overall assessment of network security coverage can be displayed alongside the network topology for the enterprise network. In the example shown, a particular solution, or zone, is selected, and a percentage of the nodes that are security enabled is depicted, as well as a list of stealth enabled and authentication enabled nodes within the selected zone. A user may also select a channel or flow between a selected zone and another zone, as seen in the user interface 2100 of FIG. 21. In that instance, information about the channel can be displayed, such as provider/consumer relationships, and whether and what types of data traffic can be exchanged (e.g., FTP, SNMP, etc.). Each type of data can selectively be allowed/disallowed within the user interface 2100, to adjust a security policy within the zone or at the edge of the zone managed by the third party security software.

Figure 22:
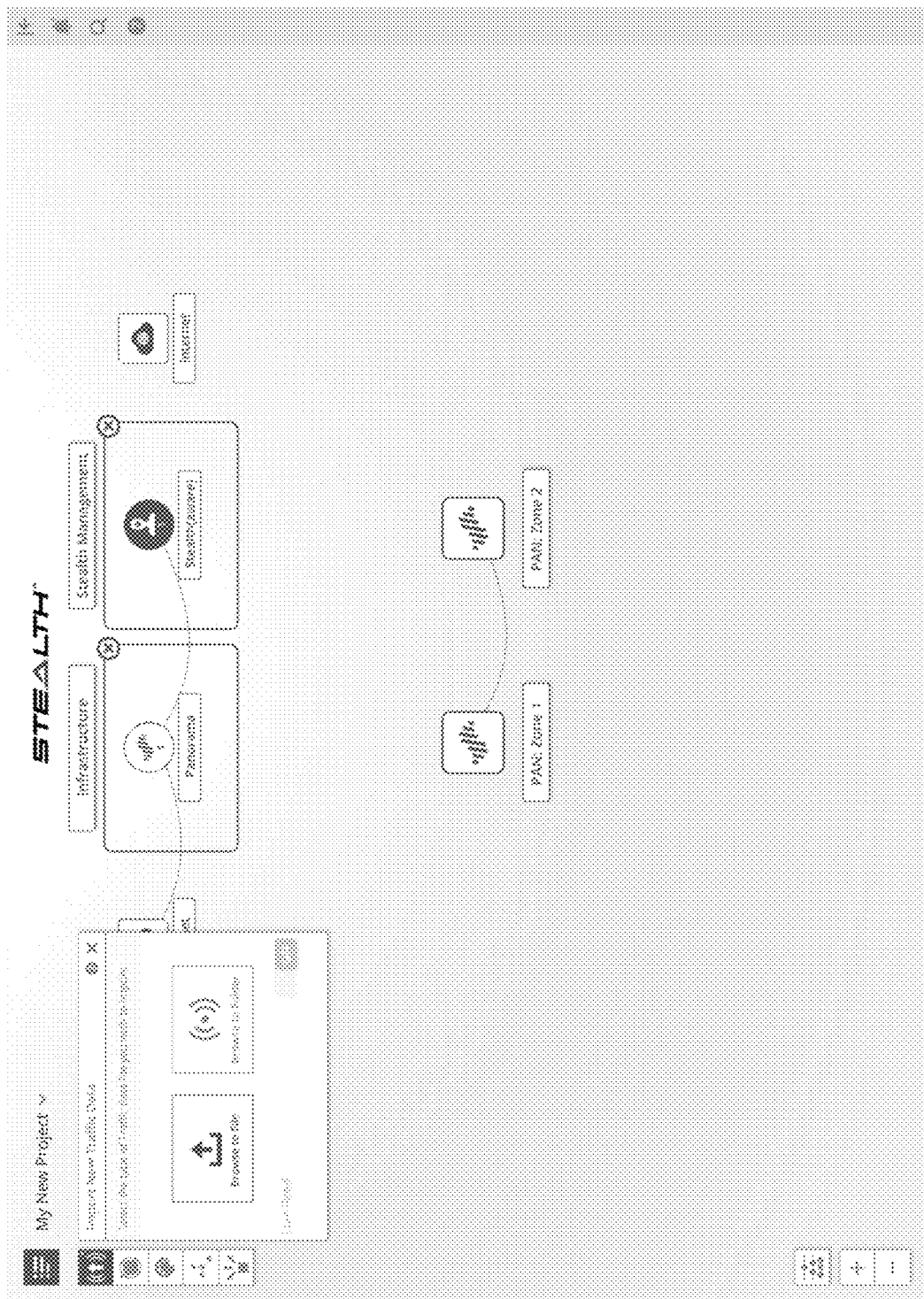
FIG. 22 is a further user interface of the enterprise security management configuration tool showing import of network traffic data, in an example implementation.
Figure 23:
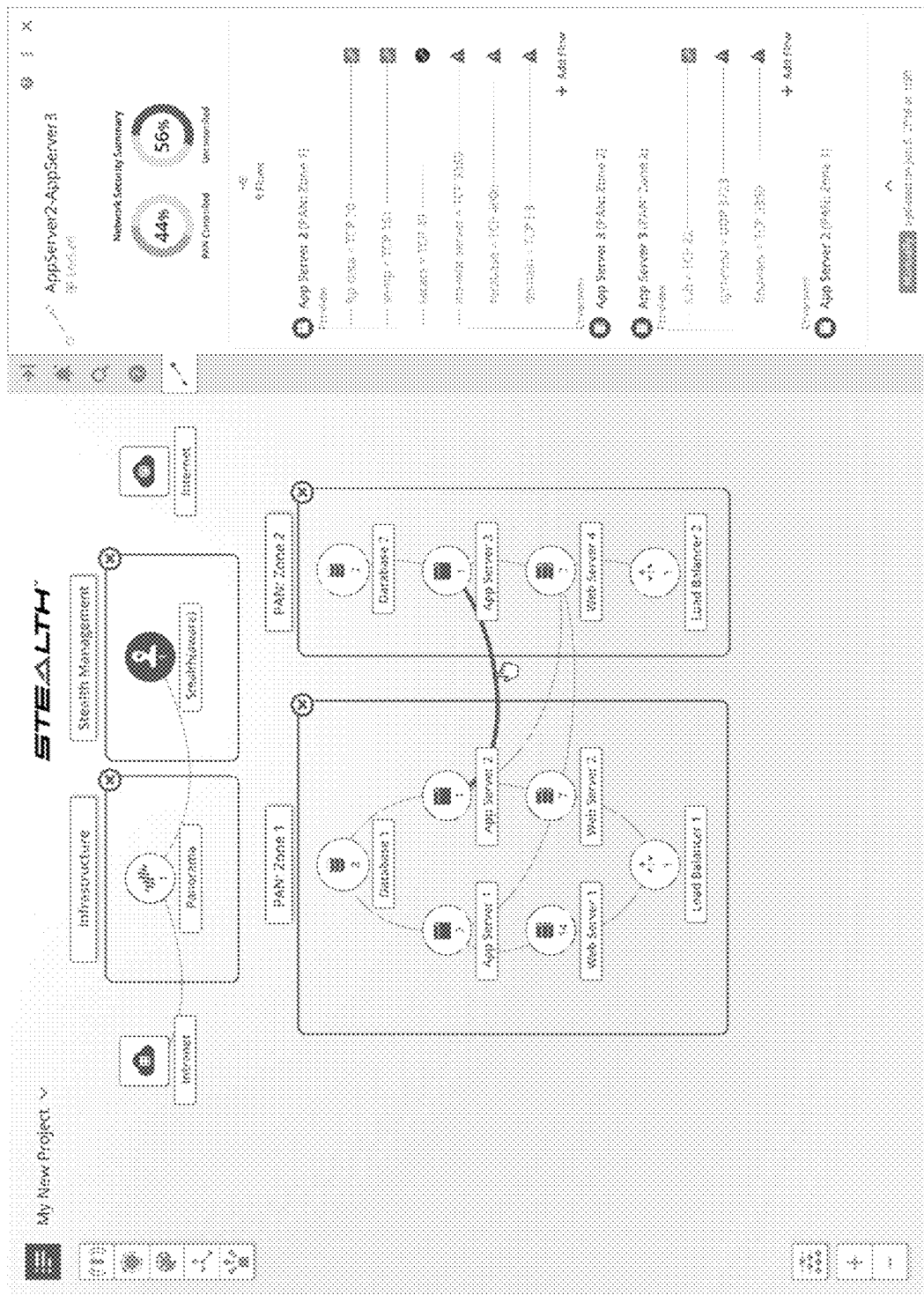
FIG. 23 is a further user interface of the enterprise security management configuration tool showing an assessment of network security coverage based on received network traffic data, in an example implementation.
Figure 24:
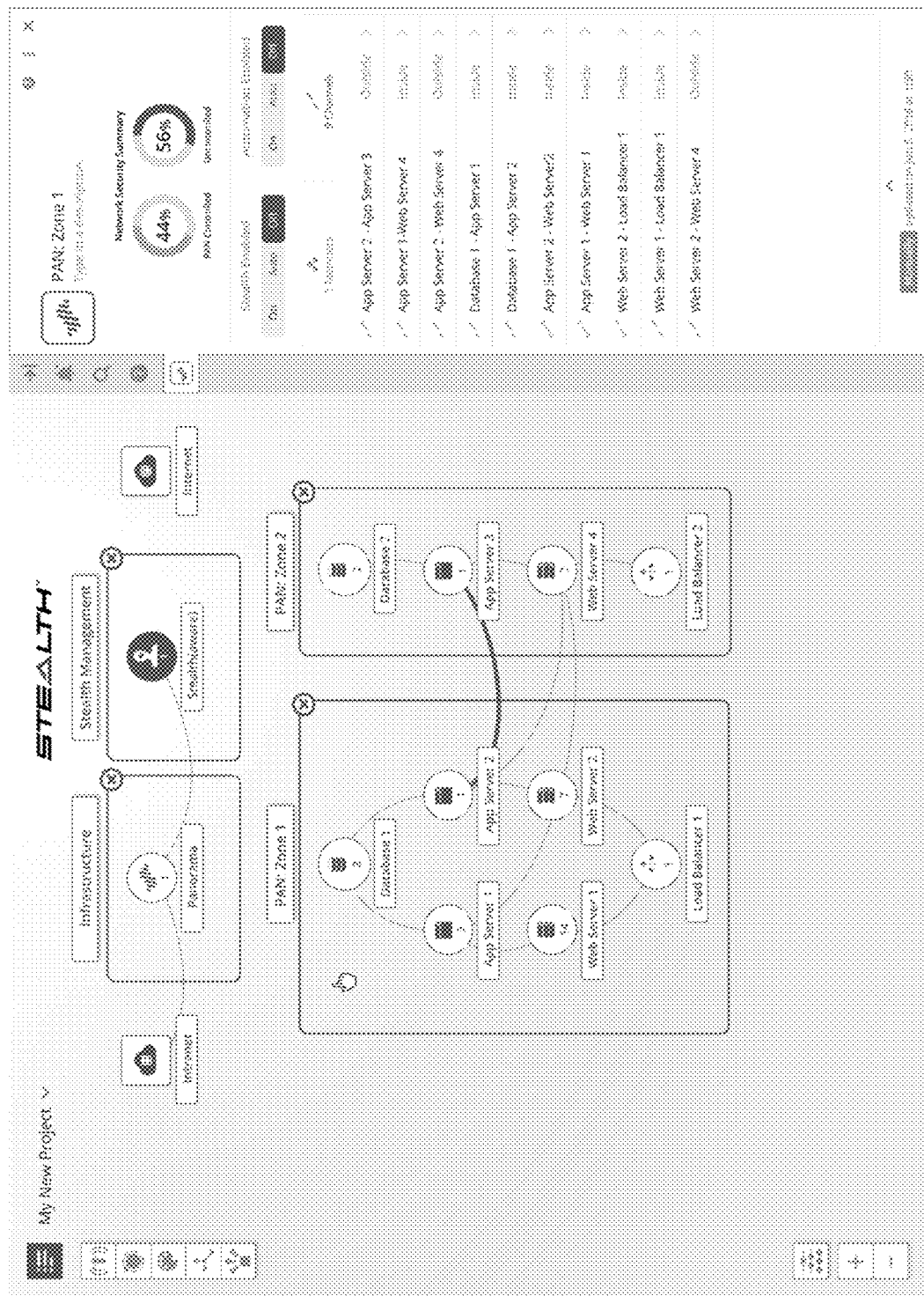
FIG. 24 is a further user interface of the enterprise security management configuration tool showing an assessment of network security coverage based on received network traffic data, in an example implementation.

Referring to FIG. 22, a user may elect to import network traffic data, e.g., using the user interface 2200 as depicted. The network traffic data can be, e.g., received via a PCAP file captured via agents installed on enterprise network devices, such as illustrated in FIG. 5, above. Upon import of such network traffic data, the user interfaces of FIGS. 20-21 can be updated to illustrate a more detailed security assessment. In particular, in the example user interface 2300 of FIG. 23, an assessment of network security coverage is provided based on the received traffic data. In this example, a percentage of traffic managed by the third party security software is depicted, as compared to the portion that remains unsecured. Additionally, on a selected channel (as shown the channel between "App Server 1" and "App Server 2"), various types of traffic are shown in list form, with a level of security applied at each. In the example shown, unsecured traffic can be highlighted with an "alert" graphic (such as a warning triangle symbol, as with the terabase and domain traffic at App Server 1, among other types), while secured traffic can be indicated with a notification symbol, such as a green box (in the case of FIG. 23, the FTP and SNMP traffic at App Server 1). In addition, rather than the flows and relative security as illustrated in the user interface 2300, in a further alternative seen in FIG. 23, channels can be illustrated in user interface 2400, with indicates as to whether those channels are inside or outside a third party security controlled region.

Figure 25:
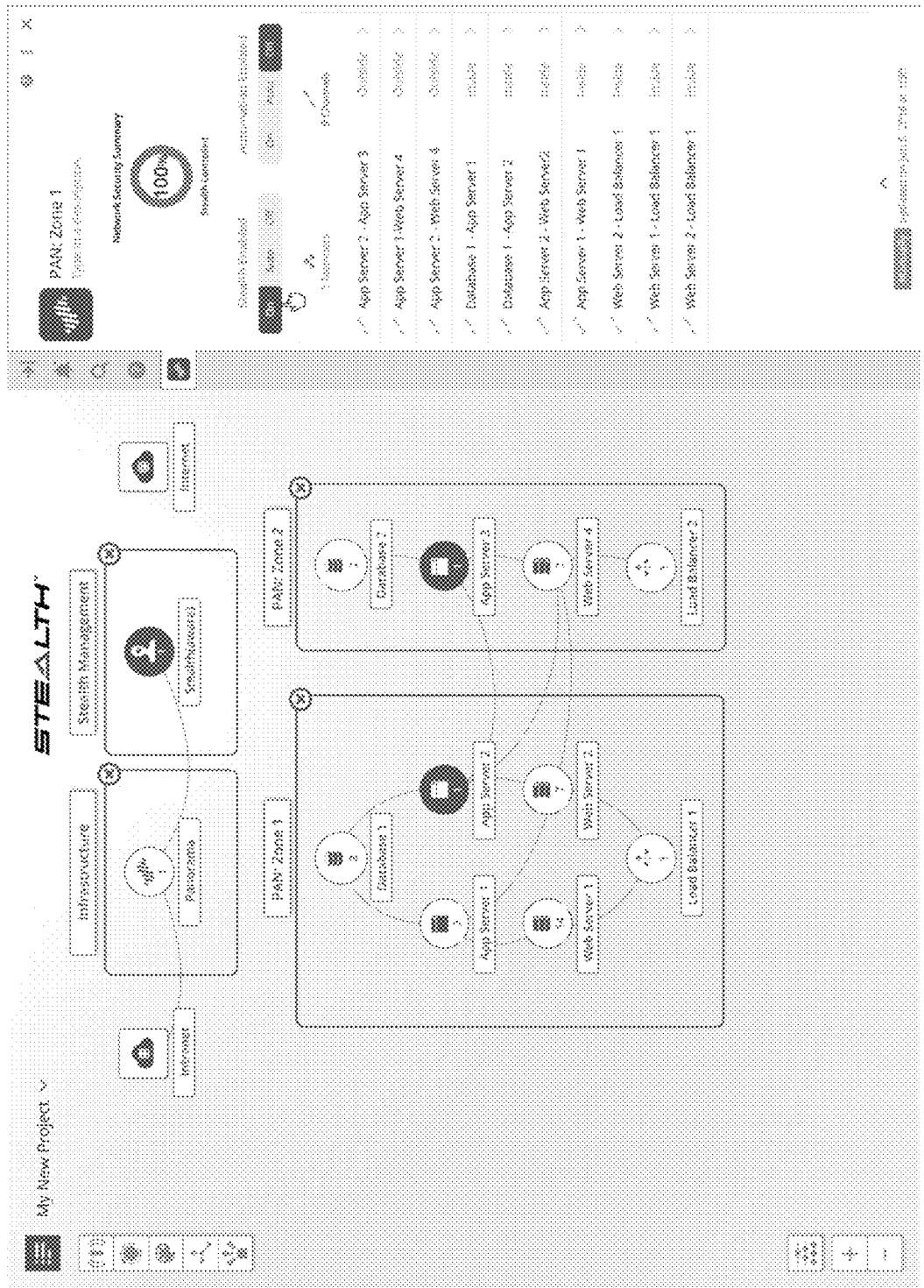
FIG. 25 is a further user interface of the enterprise security management configuration tool showing membership of nodes within portions of a network managed by third party security software, in an example implementation.
Figure 26:
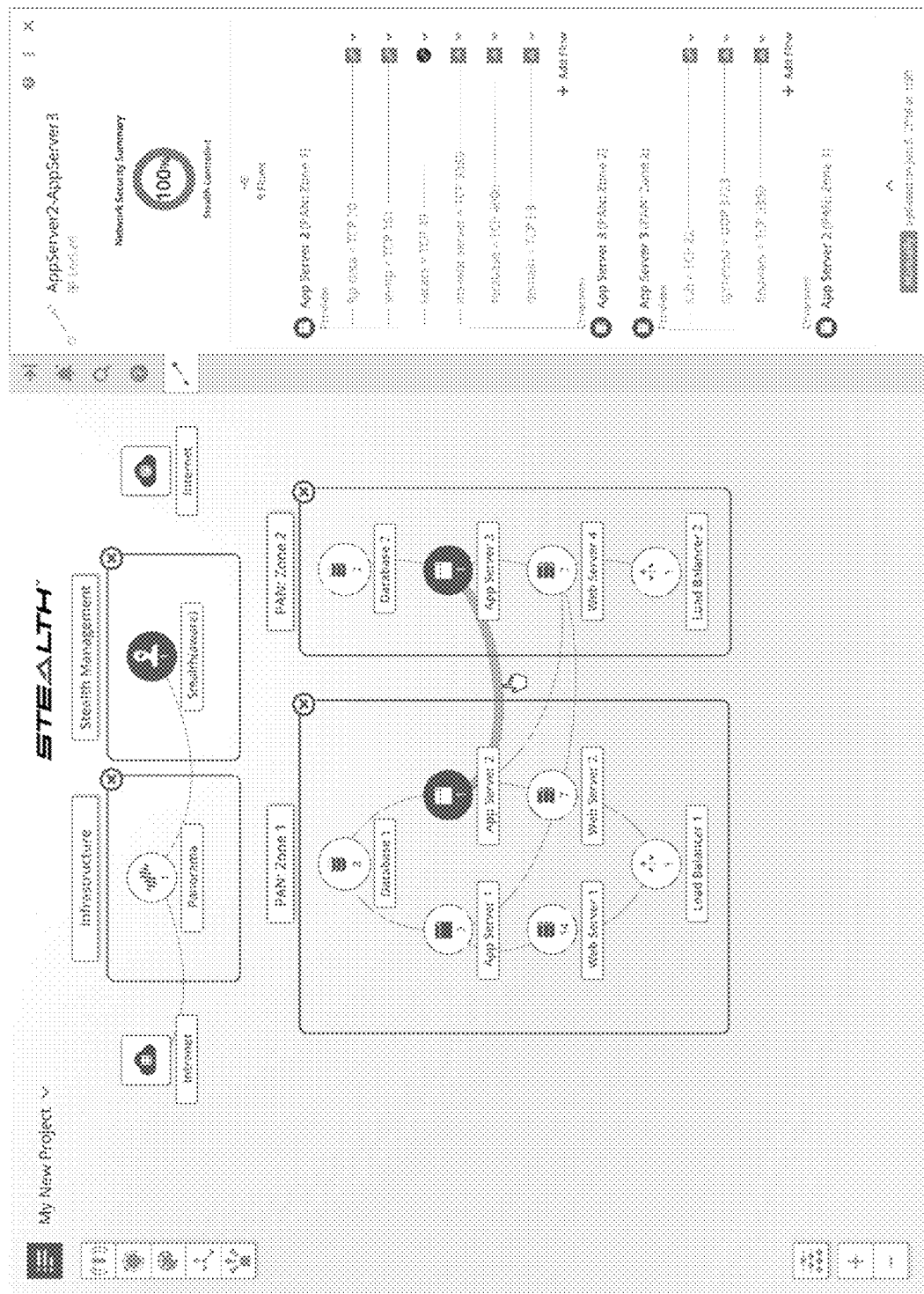
FIG. 26 is a further user interface of the enterprise security management configuration tool showing security rules to be applied to a channel between portions of the enterprise network, in an example implementation.
Figure 27:
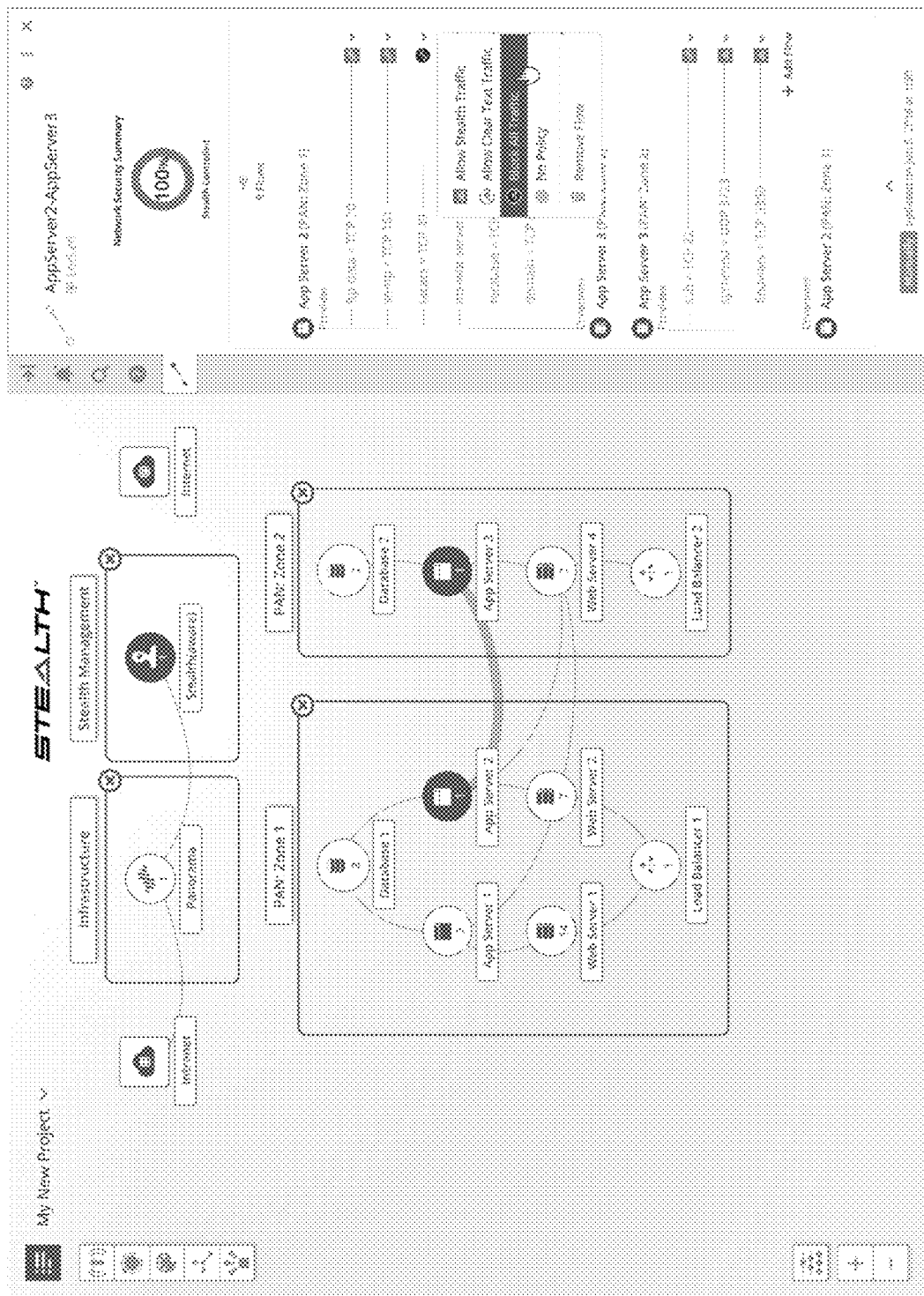
FIG. 27 is a further user interface of the enterprise security management configuration tool showing modification of security rules for a particular channel between portions of the enterprise network, in an example implementation.

A user may then optionally select to enable stealth across the nodes depicted in the enterprise network, as seen in the user interface 2500 of FIG. 25; in that example, the security assessment may be updated (in this case, to show 100% stealth controlled) to highlight a change in security due to the change in settings. The user may still view various flows, such as in the user interface 2600 of FIG. 26, which have associated therewith various icons and alerts describing security on each flow. As seen in the user interface 2700 of FIG. 27, the user may select any of the flows and change a security policy on a per-flow basis, e.g., from "Allow Stealth Traffic" (which allows only encrypted traffic), to "Allow Clear Text Traffic", or "Block All Traffic". Alternatively, the flow may be removed completely, or no policy may be defined.

It is noted that such changes may be made either within the portion of the enterprise network managed by third party security software or within the portion of the enterprise network managed solely using the enterprise security configuration tool; in the case third party software is implemented, web hooks can be implemented to propagate changes made in the graphical user interfaces back to the third party security software.

As can be seen in FIGS. 8-27 above, the enterprise security configuration tool can identify traffic traveling through a network that is not controlled by third party security software, and mark it as uncontrolled. By doing so, a user can adjust enterprise-wide policies and control that otherwise-uncontrolled traffic using an additional enterprise security system, e.g., via a deployed solution from the tool. This simplifies coexistence of different security systems while automatically exposing vulnerabilities within a network that can be readily viewed and corrected using a security policy that is easily, graphically defined.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method comprising:
   receiving a definition in an enterprise security management configuration tool of anode within an enterprise network that represents a third party network traffic management device controlled using third party traffic management software, the third party network traffic management device positioned within the enterprise to manage traffic within a portion of the enterprise network;
   accessing, via an Application Programming Interface of the third party traffic management software, configuration data for the third party network traffic management device;
   receiving, at the enterprise security management configuration tool, network traffic data describing network traffic in the enterprise network; and
   generating an assessment of network security coverage by policies in one or both of the enterprise security management configuration tool and the third party network traffic management software based at least on the network traffic data, the configuration data, and a security policy defined for the enterprise network by the enterprise security management configuration tool.

2. The method of claim 1, wherein generating the assessment of network security coverage includes determining a security level of communication between the portion of the enterprise network protected by the third party network traffic management device and a second portion of the enterprise network outside of the portion.

3. The method of claim 2, wherein the communication between the portion and the second portion occurs over one or more channels, each channel defining communication between a node within the portion and a different node within the second portion.

4. The method of claim 2, further comprising, for at least one channel of the one or more channels, changing a communication policy within the enterprise security management configuration tool between the node and the second node, thereby adjusting the security level of communication between the portion and the second portion.

5. The method of claim 1, wherein the enterprise network includes a plurality of third party network traffic management devices, and wherein accessing the configuration data comprises issuing requests to each of the plurality of third party network traffic management devices.

6. The method of claim 1, wherein, within the enterprise security management configuration tool, network devices are grouped into one or more solutions.

7. The method of claim 6, wherein the portion of the enterprise network managed by the third party network traffic management device comprises a solution.

8. The method of claim 7, wherein the solution including the third party network traffic management device includes one or more nodes communicatively connected to one or more nodes outside the solution but within the enterprise network.

9. The method of claim 8, further comprising, after accessing the configuration data for the third party network traffic management device, translating the configuration data into a logical arrangement compatible with the enterprise security management configuration tool.

10. The method of claim 9, further comprising graphically depicting the one or more nodes within the solution based on the configuration data.

11. The method of claim 1, further comprising generating a user interface displaying a logical network topology of at least a portion of the enterprise network and the assessment of network security coverage.

12. The method of claim 1, further comprising:
   detecting a change in a setting within the third party traffic management software; and
   automatically updating the assessment of network security coverage in response to the change.

13. An enterprise security management system, the system comprising:
   a computing system within an enterprise and having an enterprise security management configuration tool installed thereon, the enterprise security management configuration tool configured to:
   receive a definition in an enterprise security management configuration tool of a node within an enterprise network that represents a third party network traffic management device controlled using third party traffic management software, the third party network traffic management device positioned within the enterprise to manage traffic within a portion of the enterprise network;
   access, via an Application Programming Interface of the third party traffic management software, configuration data for the third party network traffic management device;
   receive, at the enterprise security management configuration tool, network traffic data describing network traffic in the enterprise network; and generate an assessment of network security coverage by policies in one or both of the enterprise security management software tool and the third party network traffic management software based at least on the network traffic data, the configuration data, and a security policy defined for the enterprise network by the enterprise security management configuration tool.

14. The enterprise security management software system of claim 13, further comprising at least one third party networking software management tool installed on the third party networking device.

15. The enterprise security management software system of claim 13, wherein the third party networking device comprises a firewall.

16. The enterprise security management software system of claim 13, wherein the enterprise security management configuration tool is further configured to generate a user interface displaying a logical network topology of at least a portion of the enterprise network and the assessment of network security coverage, the logical network topology based at least on the network traffic data.

17. The enterprise security management software system of claim 13, further comprising an enterprise security management server communicatively connected to the computing system hosting the enterprise security management configuration tool, the enterprise security management configuration tool being configured to deploy a security solution to the enterprise security management server for application within the enterprise network.

18. The enterprise security management software system of claim 13, wherein the enterprise security management configuration tool is further configured to, after accessing the configuration data for the third party network traffic management device, translate the configuration data into a logical arrangement compatible with the enterprise security management configuration tool, the logical arrangement including one or more solutions, profiles, and nodes.

19. A non-transitory computer readable storage medium having computer-executable instructions stored thereon which, when executed by a computing system, cause the computing system to perform:
   receiving a definition in an enterprise security management configuration tool of anode within an enterprise network that represents a third party network traffic management device controlled using third party traffic management software, the third party network traffic management device positioned within the enterprise to manage traffic within a portion of the enterprise network;
   accessing, via an Application Programming Interface of the third party traffic management software, configuration data for the third party network traffic management device;
   translating the configuration data to be displayable within the enterprise security management configuration tool;
   receiving, at the enterprise security management configuration tool, network traffic data describing network traffic in the enterprise network;
   generating an assessment of network security coverage by policies in one or both of the enterprise security management configuration tool and the third party network traffic management software based at least on the network traffic data, the configuration data, and a security policy defined for the enterprise network by the enterprise security management configuration tool; and
   deploying a solution from the enterprise security management configuration tool to an enterprise security manager, thereby applying a security policy defined by the solution to the enterprise network.

20. The non-transitory computer readable storage medium of claim 19, further comprising displaying network traffic data and network policy data from both the enterprise security management configuration tool and the third party traffic management software in a common user interface.

* * * * *